(12) United States Patent
Takagi et al.

(10) Patent No.: US 8,773,694 B2
(45) Date of Patent: Jul. 8, 2014

(54) MANAGING A PRINT JOB USING PRINT SETTING INFORMATION

(75) Inventors: Yoshihiro Takagi, Yokohama (JP); Masashi Nakagawa, Sagamihara (JP)

(73) Assignee: Canon Kabushiki Kaisha, Tokyo (JP)

(*) Notice: Subject to any disclaimer, the term of this patent is extended or adjusted under 35 U.S.C. 154(b) by 146 days.

(21) Appl. No.: 13/224,243

(22) Filed: Sep. 1, 2011

(65) Prior Publication Data

US 2012/0081740 A1    Apr. 5, 2012

(30) Foreign Application Priority Data

Sep. 30, 2010  (JP) ................................. 2010-222434
Jun. 20, 2011   (JP) ................................. 2011-136712

(51) Int. Cl.
*G06K 15/02* (2006.01)

(52) U.S. Cl.
USPC ........................................................ 358/1.15

(58) Field of Classification Search
CPC .......... G06F 15/00; G06F 9/46; G06K 15/02; H04N 1/00
USPC ....................................................... 358/1.15
See application file for complete search history.

(56) References Cited

U.S. PATENT DOCUMENTS

| 8,526,035 B2 | 9/2013 | Maeda | |
| 2003/0117638 A1* | 6/2003 | Ferlitsch | 358/1.13 |
| 2007/0008567 A1* | 1/2007 | Choi | 358/1.13 |
| 2008/0209419 A1 | 8/2008 | Maeda | |
| 2010/0171982 A1* | 7/2010 | Sato | 358/1.15 |
| 2010/0245884 A1* | 9/2010 | Komine | 358/1.15 |

FOREIGN PATENT DOCUMENTS

| JP | 2007-304881 A | 11/2007 |
| JP | 4033857 B2 | 1/2008 |
| JP | 2008-217104 A | 9/2008 |
| JP | 2010-160617 A | 7/2010 |

OTHER PUBLICATIONS

European Search Report dated Jun. 12, 2013 issued in corresponding European Patent Application No. 11181220.2.
Korean Office Action dated Dec. 3, 2013 issued in corresponding Korean Patent Application No. 10-2011-0095560.

* cited by examiner

*Primary Examiner* — Qian Yang
(74) *Attorney, Agent, or Firm* — Fitzpatrick, Cella, Harper & Scinto

(57) ABSTRACT

A print server comprises: storage unit configured to store the print job of the intermediate format received from an information processing apparatus; setting change receiving unit configured to receive, from a printing apparatus, a print setting information change instruction for the print job of the intermediate format stored in the storage unit; update unit configured to update print setting information of the print job in accordance with the print setting information change instruction; print request receiving unit configured to receive a print request from the printing apparatus; and job transmission unit configured to generate a print job of a format printable by the printing apparatus based on the print job of the intermediate format and the print setting information updated in accordance with the print request, and to transmit the generated print job to the printing apparatus.

17 Claims, 24 Drawing Sheets

F I G. 5A

| SIGN IN FIG. 4 | TRANSMISSION SOURCE | TRANSMISSION DESTINATION | TRANSMISSION DATA |
|---|---|---|---|
| 1-1 | CLIENT APPLICATION 400 | VIRTUAL PRINTER DRIVER 401 | DDI |
| 1-2 | VIRTUAL PRINTER DRIVER 401 | PRINT PROCESSOR 402 | EMFSPOOL |
| 1-3 | PRINT PROCESSOR 402 | JOB MANAGEMENT SERVICE 403 | EMFSPOOL |
| | | | GUID |
| | | | JOB NAME |
| | | | USER NAME |
| | | | DEVMODE |
| | | | LOGICAL PRINTER NAME OF VIRTUAL PRINTER DRIVER |
| 1-4 | JOB MANAGEMENT SERVICE 403 | JOB MANAGEMENT DB 404 | EMFSPOOL FILE PATH |
| | | | GUID |
| | | | JOB NAME |
| | | | USER NAME |
| | | | DEVMODE |
| | | | LOGICAL PRINTER NAME OF VIRTUAL PRINTER DRIVER |
| | | | USER TOKEN |
| | | | DATE & TIME |
| 1-5 | JOB MANAGEMENT SERVICE 403 | ADDRESS MANAGEMENT SERVICE 405 | GUID |
| | | | USER NAME |
| 1-6 | ADDRESS MANAGEMENT SERVICE 405 | ADDRESS MANAGEMENT DB 406 | GUID |
| | | | USER NAME |
| | | | IP ADDRESS |
| 2-1 | PANEL APPLICATION 407 | ADDRESS MANAGEMENT SERVICE 405 | USER NAME |
| 2-2 | ADDRESS MANAGEMENT DB 406 | ADDRESS MANAGEMENT SERVICE 405 | IP ADDRESS |
| 2-3 | ADDRESS MANAGEMENT SERVICE 405 | PANEL APPLICATION 407 | IP ADDRESS |
| 2-4 | PANEL APPLICATION 407 | JOB MANAGEMENT SERVICE 403 | USER NAME |
| 2-5 | JOB MANAGEMENT DB 404 | JOB MANAGEMENT SERVICE 403 | GUID |
| | | | JOB NAME |
| | | | DEVMODE |
| | | | LOGICAL PRINTER NAME OF VIRTUAL PRINTER DRIVER |
| | | | USER TOKEN |
| | | | DATE & TIME |

FIG. 5B

| | | | |
|---|---|---|---|
| 2-6 | JOB MANAGEMENT SERVICE 403 | PANEL APPLICATION 407 | GUID |
| | | | JOB NAME |
| | | | COPY COUNT |
| | | | DUPLEXING |
| | | | COLOR MODE |
| | | | PAGES PER SHEET |
| | | | DATE & TIME |
| 3-1 | PANEL APPLICATION 407 | JOB MANAGEMENT SERVICE 403 | GUID |
| | | | COPY COUNT |
| | | | DUPLEXING |
| | | | COLOR MODE |
| | | | PAGES PER SHEET |
| | | | MODEL NAME OF MULTI-FUNCTION PERIPHERAL |
| 3-2 | JOB MANAGEMENT DB 404 | JOB MANAGEMENT SERVICE 403 | DEVMODE |
| 3-3 | JOB MANAGEMENT SERVICE 403 | PANEL APPLICATION 407 | GUID |
| | | | COPY COUNT |
| | | | DUPLEXING |
| | | | COLOR MODE |
| | | | PAGES PER SHEET |
| 4-1 | PANEL APPLICATION 407 | JOB MANAGEMENT SERVICE 403 | GUID |
| | | | MODEL NAME OF MULTI-FUNCTION PERIPHERAL |
| 4-2 | JOB MANAGEMENT DB 404 | JOB MANAGEMENT SERVICE 403 | EMFSPOOL FILE PATH |
| | | | DEVMODE |
| | | | USER TOKEN |
| 4-3 | JOB MANAGEMENT SERVICE 403 | PRINTER DRIVER 408 | EMFSPOOL |
| | | | DEVMODE |
| 4-4 | PRINTER DRIVER 408 | MULTI-FUNCTION PERIPHERAL 102 | PDL JOB DATA |
| 5-1 | PANEL APPLICATION 407 | JOB MANAGEMENT SERVICE 403 | GUID |
| 5-2 | JOB MANAGEMENT SERVICE 403 | ADDRESS MANAGEMENT SERVICE 405 | GUID |
| 5-3 | ADDRESS MANAGEMENT SERVICE 405 | ADDRESS MANAGEMENT DB 406 | |
| 5-4 | JOB MANAGEMENT SERVICE 403 | JOB MANAGEMENT DB 404 | |

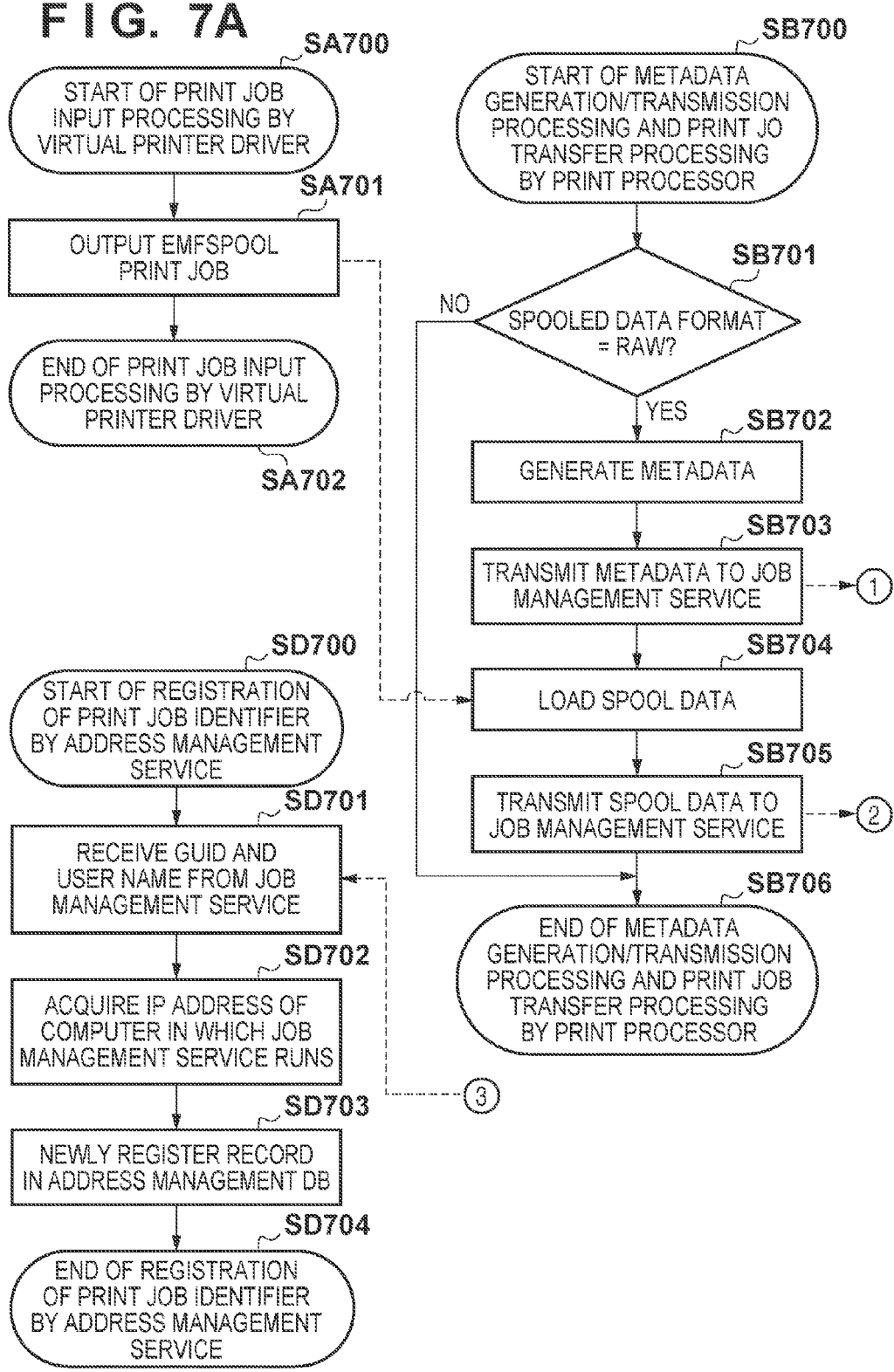

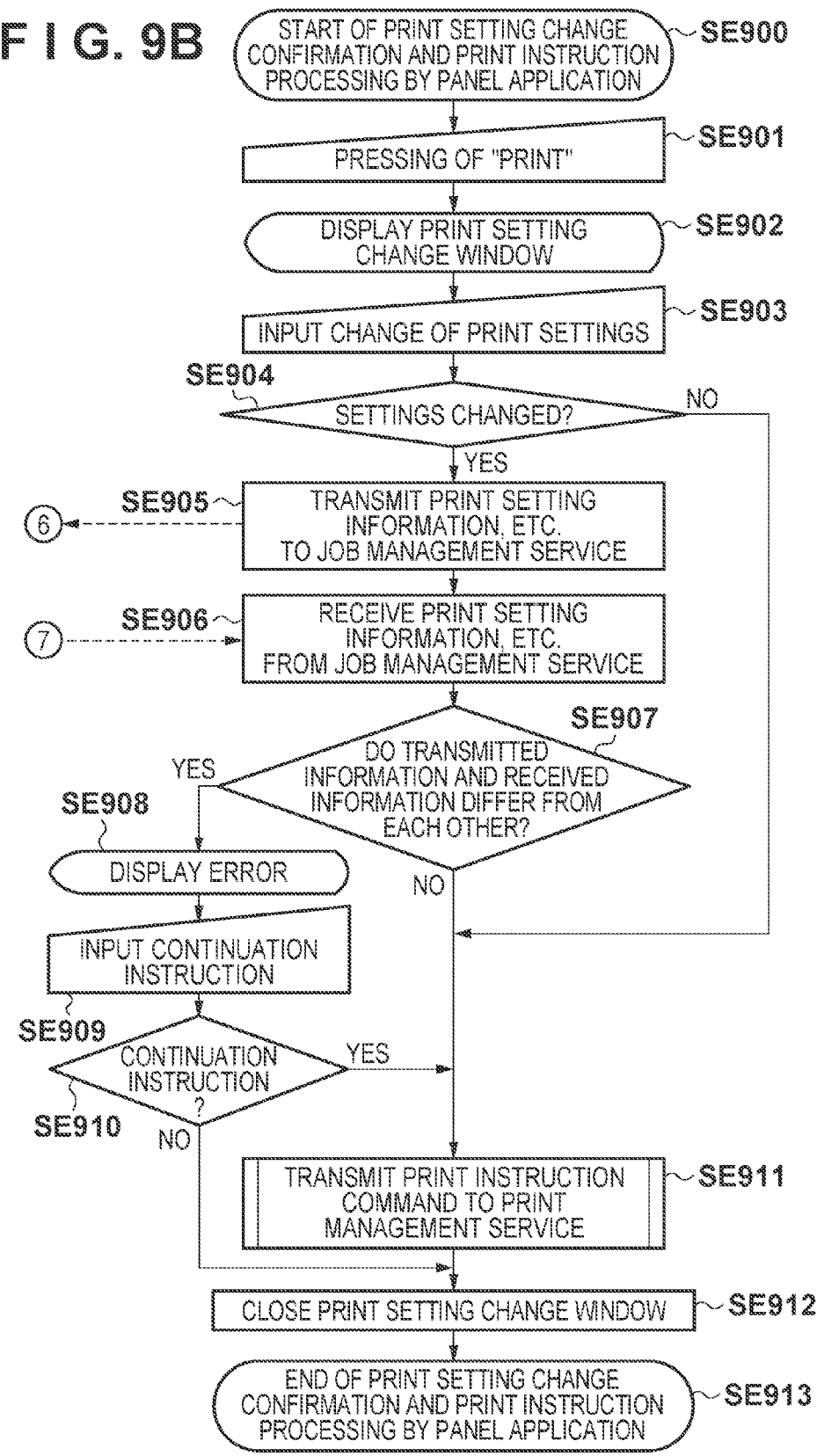

F I G. 13A

```xml
<?xml version="1.0" encoding="utf-8"?>
<JobInfo
    Guid="{93DEBE22-682C-4806-AC24-CC8A4589A26F}"
    JobName="STATEMENT OF ACCOUNTS"
    UserName="Taro Yamada"
    PrintQueueName="PULL PRINT"
    >
       <DocumentSettings
           DevmodeSnapshot="QwBhAG4AbwBuACAAaQB..."
       />
</JobInfo>
```

F I G. 13B

```xml
<?xml version="1.0" encoding="utf-8"?>
<JobInfo
    Guid="{93DEBE22-682C-4806-AC24-CC8A4589A26F}"
    DeviceModelName="Cxxx ix6000"
    >
       <DocumentSettings
           CopyCount="1"
           Duplexing="TwoSidedLongEdge"
           OutputColor="Color"
           PagesPerSheet="1"
       />
</JobInfo>
```

F I G. 13C

```xml
<?xml version="1.0" encoding="utf-8"?>
<JobInfo Guid="{93DEBE22-682C-4806-AC24-CC8A4589A26F}">
    <DocumentSettings
        CopyCount="1"
        Duplexing="OneSided"
        OutputColor="Color"
        PagesPerSheet="1"
    />
</JobInfo>
```

FIG. 14A

```xml
<?xml version="1.0" encoding="utf-8"?>
<JobList>
<JobInfo Guid="{93DEBE22-682C-4806-AC24-CC8A4589A26F}" JobName="STATEMENT OF ACCOUNTS">
    <DocumentSettings
        CopyCount="1"
        Duplexing="OneSided"
        OutputColor="Color"
        PagesPerSheet="1"
        DateTime="2010-1-14T10:19:00+09:00"
    />
</JobInfo>
<JobInfo Guid="{D00AE377-4771-41c4-9A30-46BB3955367F}" JobName="ESTIMATE">
    <DocumentSettings
        CopyCount="5"
        Duplexing="OneSided"
        OutputColor="Monochrome"
        PagesPerSheet="1"
        DateTime="2010-1-14T10:19:00+09:00"
    />
</JobInfo>
<JobInfo Guid="{2258253-96CF-4896-8039-82627ADACB9A}" JobName="LEAVE OF ABSENCE APPLICATION">
    <DocumentSettings
        CopyCount="1"
        Duplexing="TwoSidedLongEdge"
        OutputColor="Monochrome"
        PagesPerSheet="1"
        DateTime="2010-1-14T10:19:00+09:00"
    />
</JobInfo>
<JobInfo Guid="{08DF859D-00F8-4619-A867-CD95330B6083}" JobName="PROJECT PROPOSAL">
    <DocumentSettings
        CopyCount="1"
        Duplexing="OneSided"
        OutputColor="Color"
        PagesPerSheet="1"
        DateTime="2010-1-14T10:20:00+09:00"
    />
```

FIG. 14B

```
  />
</JobInfo>
<JobInfo Guid="{586B8D3F-9CDC-4f9c-A642-B5067FF357E6}" JobName="1111111112222222223333333344444444">
  <DocumentSettings
    CopyCount="1"
    Duplexing="OneSided"
    OutputColor="Monochrome"
    PagesPerSheet="1"
    DateTime="2010-1-14T10:20:00+09:00"
  />
</JobInfo>
<JobInfo Guid="{985908C2-D27E-479d-89F5-E02A41715817}" JobName="ABCDEFGHIJKLMN">
  <DocumentSettings
    CopyCount="1"
    Duplexing="OneSided"
    OutputColor="Monochrome"
    PagesPerSheet="1"
    DateTime="2010-1-14T10:21:00+09:00"
  />
</JobInfo>
<JobInfo Guid="{050AE3B0-5D19-4036-B3CE-FD5FACFBCC0C}" JobName="MEETING MATERIALS">
  <DocumentSettings
    CopyCount="1"
    Duplexing="OneSided"
    OutputColor="Color"
    PagesPerSheet="2"
    DateTime="2010-1-14T10:21:00+09:00"
  />
</JobInfo>
</JobList>
```

F I G. 15A
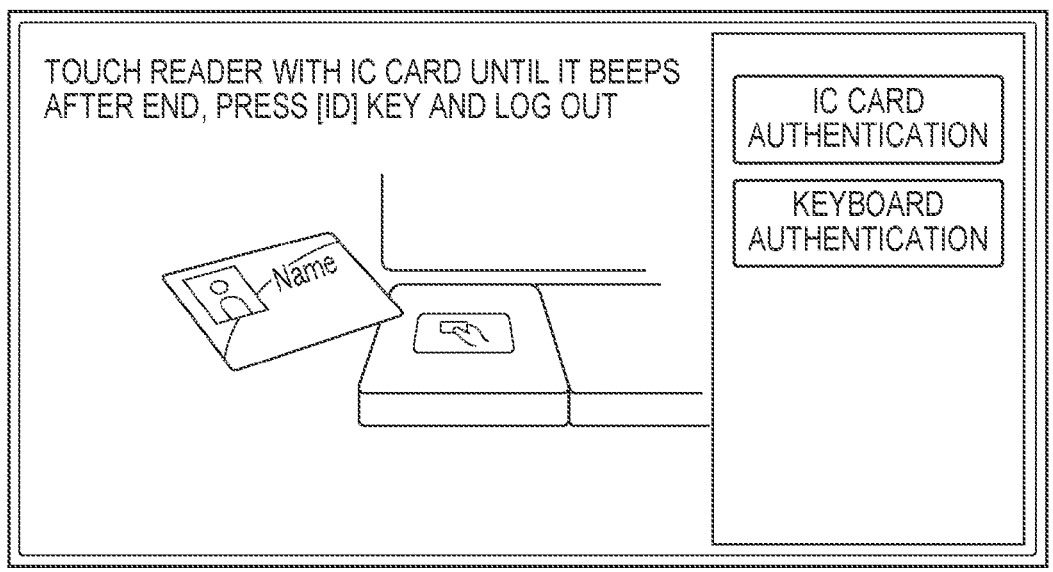
F I G. 15B
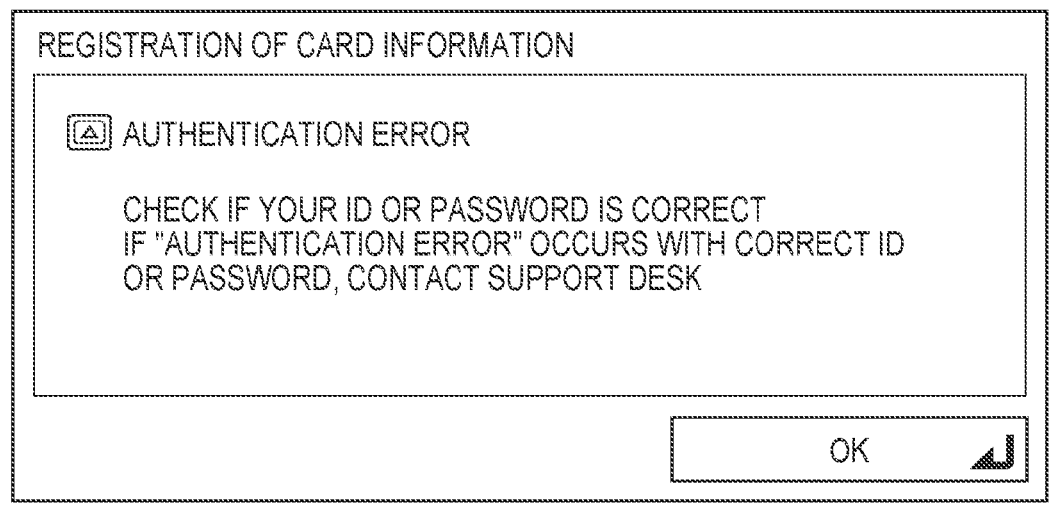

FIG. 15C

PULL PRINT

👤 Taro Yamada | UPDATE | DOCUMENT COUNT: 7

| DOCUMENT NAME | COLOR MODE | DUPLEXING | PAGES PER SHEET | COPY COUNT | DATE & TIME |
|---|---|---|---|---|---|
| ■ STATEMENT OF ACCOUNTS | COLOR | ONE-SIDED | 1 in 1 | 1 COPY | 01/14 10:19 |
| ☐ ESTIMATE | MONOCHROME | ONE-SIDED | 1 in 1 | 5 COPIES | 01/14 10:19 |
| ☐ LEAVE OF ABSENCE APPLICATION | MONOCHROME | TWO-SIDED | 1 in 1 | 1 COPY | 01/14 10:19 |
| ☐ PROJECT PROPOSAL | COLOR | ONE-SIDED | 1 in 1 | 1 COPY | 01/14 10:20 |
| ☐ 1111111112222222222233333333334444444444 | MONOCHROME | ONE-SIDED | 1 in 1 | 1 COPY | 01/14 10:20 |
| ☐ ABCDEFGHIJKLMN | MONOCHROME | ONE-SIDED | 1 in 1 | 1 COPY | 01/14 10:21 |
| ☐ MEETING MATERIALS | COLOR | ONE-SIDED | 2 in 1 | 1 COPY | 01/14 10:21 |

1/1 ◀ ▶    ◀◀ ▶▶

[ERASE] ~1421

[SELECT ALL] [CANCEL SELECTION]   1422~ [PRINT]   [↪ LOG OUT]

FIG. 16A

| | PULL PRINT |
|---|---|
| 1431 | COLOR MODE: ☐ MONOCHROME ☑ COLOR |
| 1432 | DUPLEXING: [ONE-SIDED ▼] |
| 1433 | PAGES PER SHEET: [1 in 1 ▼] |
| 1434 | COPY COUNT: [1] |

☑ ERASE DOCUMENT AFTER PRINTING  [CANCEL]  [START PRINTING] — 1437

[⇨ LOG OUT]

CHANGE OF PRINT SETTINGS

▲ PRINT SETTING ERROR

DUPLEXING SETTING COULD NOT BE CHANGED FROM "ONE-SIDED" TO "TWO-SIDED (LONG-EDGE BINDING)"
DO YOU WANT TO START PRINTING WITHOUT CHANGE?

[CANCEL]   [OK]
  1441      1442

FIG. 16C

EXECUTION OF PRINTING

▲ PRINTING EXECUTION ERROR

FATAL ERROR OCCURRED DURING EXECUTION OF PRINTING

[OK]

F I G. 17

```xml
<?xml version="1.0" encoding="UTF-8" ?>
<psf:PrintDisableItems version="1"
   xmlns:psf="http://schemas.microsoft.com/windows/2003/08/printing/printschemaframework"
   xmlns:xsi="http://www.w3.org/2001/XMLSchema-instance"
   xmlns:xsd="http://www.w3.org/2001/XMLSchema"
   xmlns:psk="http://schemas.microsoft.com/windows/2003/08/printing/printschemakeywords"
   xmlns:ns0000="http://www.canon.com/ns/printschema/oip/v100">

<psf:Feature name="psk:PageMediaType">
      <psf:Property name="psk:DisplayName">
         <psf:Value xsi:type="xsd:string">PAPER TYPE</psf:Value>
      </psf:Property>
      <psf:DisableItem name="ns0000:Recycled" constrained="psk:None">
         <psf:Property name="psk:DisplayName">
            <psf:Value xsi:type="xsd:string">RECYCLED PAPER</psf:Value>
         </psf:Property>
      </psf:DisableItem>
      <psf:Property name="psf:SelectionType">
         <psf:Value xsi:type="xsd:QName">psk:PickOne</psf:Value>
      </psf:Property>
      <psf:Option name="psk:Plain" constrained="psk:None">
         <psf:Property name="psk:DisplayName">
            <psf:Value xsi:type="xsd:string">PLAIN PAPER(64~105g/m$^2$)</psf:Value>
         </psf:Property>
      </psf:Option>
      <psf:Option name="ns0000:Color" constrained="psk:None">
         <psf:Property name="psk:DisplayName">
            <psf:Value xsi:type="xsd:string">COLORED PAPER</psf:Value>
         </psf:Property>
      </psf:Option>
      <psf:Option name="psk:None" constrained="psk:None">
         <psf:Property name="psk:DisplayName">
            <psf:Value xsi:type="xsd:string">UNDESIGNATED</psf:Value>
         </psf:Property>
      </psf:Option>
   </psf:Feature>
</psf:PrintDisableItems>
```

FIG. 18

PULL PRINT

- 1431 — COLOR MODE: ☐ MONOCHROME ☑ COLOR
- 1432 — DUPLEXING: [ONE-SIDED ▼]
- 1433 — PAGES PER SHEET: [1 in 1 ▼]
- 1434 — COPY COUNT: [1]
- 1801 — ⚠ THERE IS UNPRINTABLE SETTING
- 1802 — PAPER TYPE: ⊗ RECYCLED PAPER → [PLAIN PAPER ▼]
- 1435 — ☑ ERASE DOCUMENT AFTER PRINTING
- 1436 — [CANCEL]
- 1437 — [START PRINTING]
- [LOG OUT]

MANAGING A PRINT JOB USING PRINT SETTING INFORMATION

BACKGROUND OF THE INVENTION

1. Field of the Invention

The present invention relates to a printing system, printing method, print server, control method, and computer-readable medium for performing pull print control.

2. Description of the Related Art

There has conventionally been proposed a so-called "pull print" printing system capable of outputting print data from a printing apparatus when the user issues a print request to the printing apparatus for print data temporarily stored in a server (see, for example, Japanese Patent No. 4033857). In printing from an application, the user can output print data not from a specific printing apparatus but from a printing apparatus of his choice.

As a re-printing method for a printout the user did not intend, the following system is proposed (see, for example, Japanese Patent Laid-Open No. 2007-304881). More specifically, the UI (User Interface) of a printer driver running on a client PC is displayed on the panel of a printing apparatus. The user operates the UI to designate re-print settings and re-printing.

It is difficult for the conventional method to designate a change of print setting information when the user issues a print request from the printing apparatus for print data temporarily stored in the server. Print data temporarily stored in the server has a PDL (Page Description Language) format dependent on the printing apparatus. Hence, PDL data has to be edited according to a print setting information change instruction. For example, assume that the user designates a print setting to impose four pages on one page (to be referred to as 4in1) when he issues a print request from the printing apparatus for print data temporarily stored in the server. At this time, PDL print data temporarily stored in the server needs to be changed to match 4in1. If PDL is a raster format dependent on the resolution of the printing apparatus, a raster image is reduced to implement 4in1, causing various problems of quality degradation such as loss of a thin line. Since PDL has a variety of specifications, much labor is required to cope with these PDL specifications. In the first place, if a PDL specification is not open to the public, no PDL can be changed.

As a method of designating a change of print setting information by the user from the printing apparatus, the UI of a printer driver running on a client PC is displayed on the panel of the printing apparatus. However, it is hard to apply this method to a pull print system. A printing apparatus to output has not been finalized yet when the user designates printing on the client PC to execute pull print. The functions of a printer driver UI for use have to be general-purpose ones independent of the printing apparatus. A printing apparatus to output is finalized only after the user goes to the printing apparatus and operates the panel of the printing apparatus. The functions of the pull print printer driver UI displayed on the panel of the printing apparatus are merely general-purpose ones. In other words, functions specific to the printing apparatus cannot be used, limiting print settable functions.

SUMMARY OF THE INVENTION

According to one aspect of the present invention, there is provided a printing system comprising an information processing apparatus including a virtual printer driver which generates a print job of an intermediate format, a print server which manages the print job, and a printing apparatus, the print server including: storage unit configured to store the print job of the intermediate format received from the information processing apparatus; setting change receiving unit configured to receive, from the printing apparatus, a print setting information change instruction for the print job of the intermediate format stored in the storage unit; update unit configured to update print setting information of the print job in accordance with the print setting information change instruction; print request receiving unit configured to receive a print request from the printing apparatus; and job transmission unit configured to generate a print job of a format printable by the printing apparatus based on the print job of the intermediate format and the print setting information updated by the update unit in accordance with the print request, and to transmit the generated print job to the printing apparatus, the printing apparatus including: selection unit configured to select a print job; setting change transmission unit configured to transmit the print setting information change instruction for the print job selected by the selection unit; print request transmission unit configured to transmit the print request to the print server for the print job; and printing unit configured to print the print job transmitted by the job transmission unit.

According to another aspect of the present invention, there is provided a printing method in a printing system including an information processing apparatus including a virtual printer driver which generates a print job of an intermediate format, a print server which manages the print job, and a printing apparatus, comprising in the print server: a storage step of storing, in a storage unit, the print job of the intermediate format received from the information processing apparatus; a setting change receiving step of receiving, from the printing apparatus, a print setting information change instruction for the print job of the intermediate format stored in the storage unit; an update step of updating print setting information of the print job in accordance with the print setting information change instruction; a print request receiving step of receiving a print request from the printing apparatus; and a job transmission step of generating a print job of a format printable by the printing apparatus based on the print job of the intermediate format and the print setting information updated in the update step in accordance with the print request, and transmitting the generated print job to the printing apparatus, and comprising in the printing apparatus: a selection step of selecting a print job; a setting change transmission step of transmitting the print setting information change instruction for the print job selected in the selection step; a print request transmission step of transmitting the print request to the print server for the print job; and a printing step of printing the print job transmitted in the job transmission step.

According to another aspect of the present invention, there is provided a print server which communicates with an information processing apparatus including a virtual printer driver which generates a print job of an intermediate format, and a printing apparatus, comprising: storage unit configured to store the print job of the intermediate format received from the information processing apparatus; setting change receiving unit configured to receive, from the printing apparatus, a print setting information change instruction for the print job of the intermediate format stored in the storage unit; update unit configured to update print setting information of the print job in accordance with the print setting information change instruction; print request receiving unit configured to receive a print request from the printing apparatus; and job transmission unit configured to generate a print job of a format printable by the printing apparatus based on the print job of the intermediate format and the print setting information updated by the update unit in accordance with the print request, and transmitting the generated print job to the printing apparatus.

According to another aspect of the present invention, there is provided a method of controlling a print server which communicates with an information processing apparatus including a virtual printer driver which generates a print job of an intermediate format, and a printing apparatus, comprising: a storage step of storing, in a storage unit, the print job of the intermediate format received from the information processing apparatus; a setting change receiving step of receiving, from the printing apparatus, a print setting information change instruction for the print job of the intermediate format stored in the storage unit; an update step of updating print setting information of the print job in accordance with the print setting information change instruction; a print request receiving step of receiving a print request from the printing apparatus; and a job transmission step of generating a print job of a format printable by the printing apparatus based on the print job of the intermediate format and the print setting information updated in the update step in accordance with the print request, and transmitting the generated print job to the printing apparatus.

According to another aspect of the present invention, there is provided a storage medium storing a program for causing a computer to function as storage unit configured to store a print job of an intermediate format received from an information processing apparatus, setting change receiving unit configured to receive, from a printing apparatus, a print setting information change instruction for the print job of the intermediate format stored in the storage unit, update unit configured to update print setting information of the print job in accordance with the print setting information change instruction, print request receiving unit configured to receive a print request from the printing apparatus, and job transmission unit configured to generate a print job of a format printable by the printing apparatus based on the print job of the intermediate format and the print setting information updated by the update unit in accordance with the print request, and to transmit the generated print job to the printing apparatus.

According to the present invention, when the user issues a print request from a printing apparatus for print data temporarily stored in a server, he can designate a change of print settings. A program which runs on the printing apparatus and designates a change of print settings requests not a client PC but a printer driver suited to the printing apparatus in the server to change print settings. Print settings can therefore be changed appropriately.

Further features of the present invention will become apparent from the following description of exemplary embodiments (with reference to the attached drawings).

BRIEF DESCRIPTION OF THE DRAWINGS

FIGS. 5A and 5B are tables showing details of each data sequence;

FIGS. 7A and 7B are flowcharts exemplifying the first control processing in the printing system;

FIGS. 9A and 9B are flowcharts exemplifying the third control processing in the printing system;

FIGS. 13A, 13B, and 13C are views showing details of data;

FIGS. 14A and 14B are views showing details of data;

FIGS. 15A, 15B, and 15C are schematic views each showing a window displayed on the display unit of the operation unit of the multi-function peripheral;

FIGS. 16A, 16B, and 16C are schematic views each showing a window displayed on the display unit of the operation unit of the multi-function peripheral;

FIG. 17 is a view showing details of data; and

FIG. 18 is a schematic view showing a window displayed on the display unit of the operation unit of the multi-function peripheral.

DESCRIPTION OF THE EMBODIMENTS

System Configuration

Figure 1:
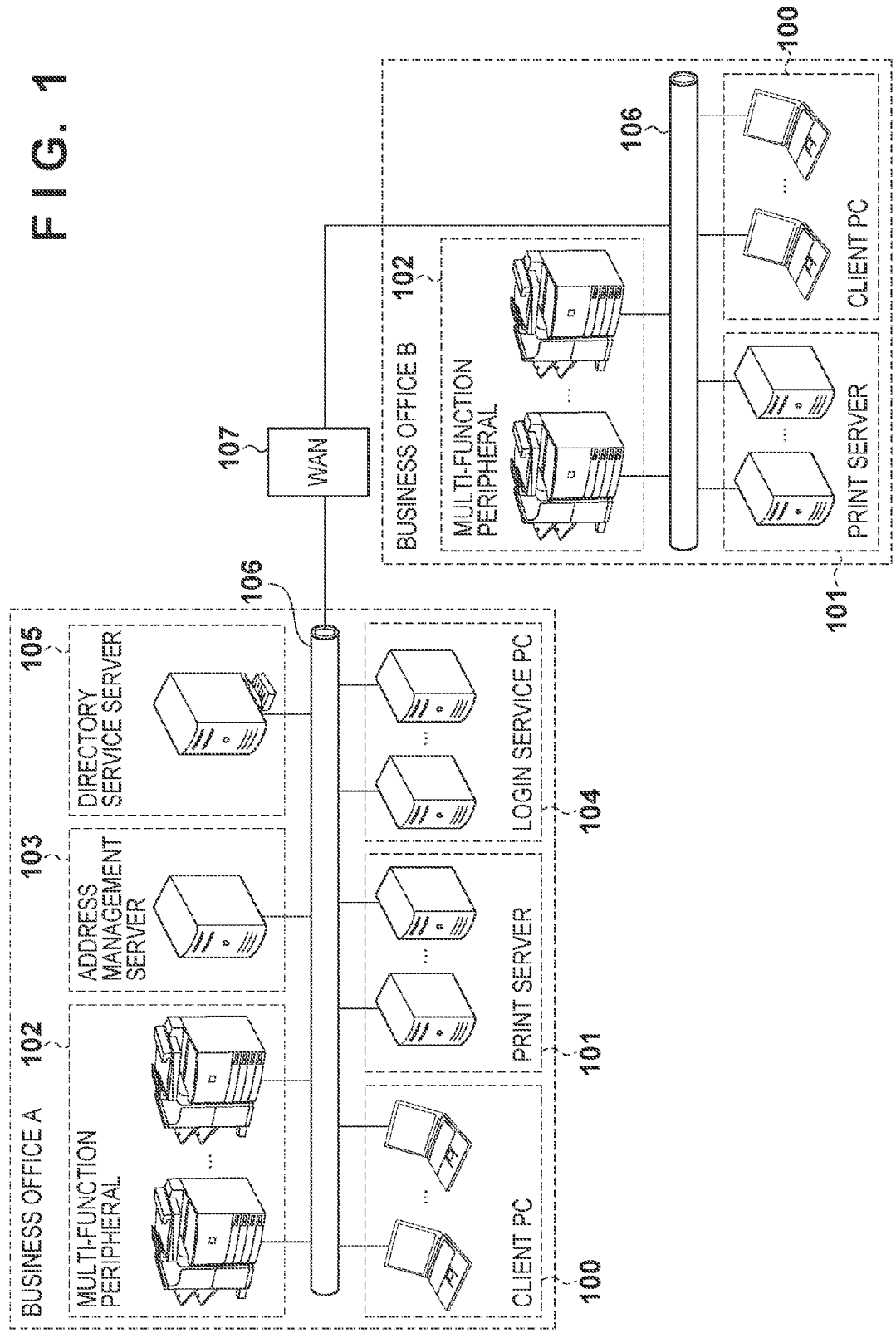
FIG. 1 is a view exemplifying the configuration of a printing system.

Embodiments of the present invention will now be described with reference to the accompanying drawings. FIG. 1 is a view exemplifying the configuration of a printing system to which an information processing apparatus, print server, address management server, and printing apparatus according to the present invention are applicable. Like "business office A" in FIG. 1, the printing system of the embodiment is configured by connecting one or a plurality of client PCs 100, one or a plurality of print servers 101, one or a plurality of multi-function peripherals 102, an address management server 103, one or a plurality of login service PCs 104, and a directory service server 105 via a local area network (LAN) 106.

A virtual printer driver is installed in the client PC 100. The virtual printer driver generates a print job of an intermediate format independent of a specific multi-function peripheral based on data received from a client application, and transmits it to the print server 101. Note that a print job of an intermediate format indicates print data of a format which has common format specifications open to the public and facilitates reediting. Examples are EMFSPOOL (Enhanced Metafile Spool Format) and XPS (XML Paper Specification). The embodiment will adopt the EMFSPOOL format, but print data of another intermediate format such as XPS or PDF is also available.

The print server 101 stores the received print job in a predetermined storage location. The print server 101 includes a job management database (to be referred to as job management DB), and stores metadata regarding the print job in the job management DB. The print server 101 generates print job list information (print job list data) from the metadata stored in the job management DB, and transfers it to the multi-function peripheral 102. The print server 101 updates print setting information using the metadata stored in the job management DB and print setting information received from the multi-function peripheral 102. The print server 101 transfers the updated print setting information to the multi-function peripheral 102. The print server 101 generates PDL (Page Description Language) from the print job saved in the predetermined storage location and the metadata which is recorded and managed in the job management DB. The print server 101 transfers the generated PDL data to the multi-function peripheral 102.

The address management server 103 includes an address management database (to be referred to as address management DB). When executing "pull print" processing in the embodiment, the address management server 103 stores address information (to be referred to as address) of the print server 101 which manages a print job, and a user identifier in the address management DB. In response to a print job list request from the multi-function peripheral 102, the address management server 103 transmits, to the multi-function peripheral 102, the address of a print server 101 corresponding to a user identifier received from the multi-function peripheral 102.

As a login service for the multi-function peripheral 102, the login service PC 104 performs authentication processing based on the login user name and password of the client PC 100 (for example, the login user name and password of Microsoft Windows®) that are stored in the directory service server 105. An example of the authentication processing is SSO (Single Sign-ON). An example of the login service PC 104 is a personal computer in which Security Agent available from CANON is installed.

The directory service server 105 stores information about hardware resources such as a server, client, and printer on a network, and the attributes, access rights, and the like (including the login user name and password of the client PC 100) of users of these hardware resources. An example of the directory service server 105 is a server having an active directory function.

In "business office B", one or a plurality of client PCs 100, one or a plurality of print servers 101, and one or a plurality of multi-function peripherals 102 are connected via the LAN 106. The printing system of the embodiment may be configured by connecting "business office A" having the above configuration and one or a plurality of "business office B"s via a WAN 107.

As the function of each server, one apparatus may implement the functions of a plurality of servers, or a plurality of apparatuses may implement one function in cooperation with each other.

[Information Processing Apparatus]

Figure 2:
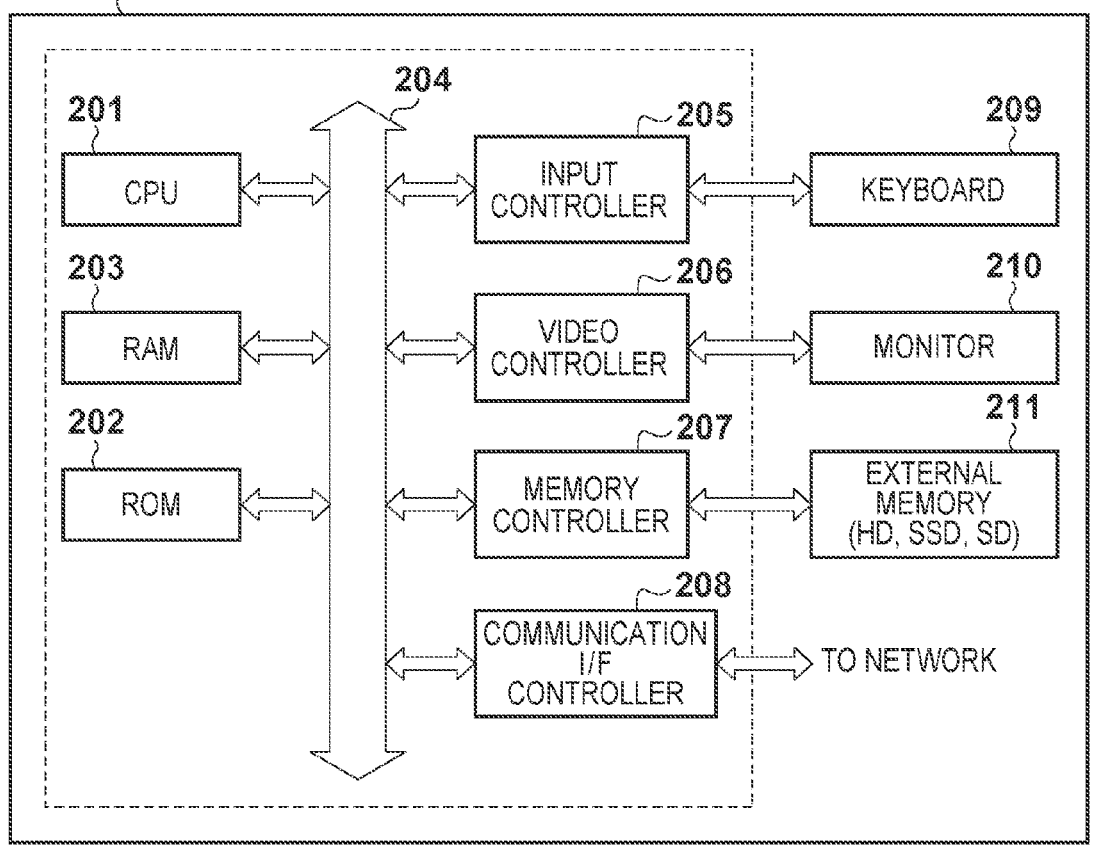
FIG. 2 is a block diagram showing the hardware configuration of each apparatus.

The hardware configuration of an information processing apparatus applicable to the client PC 100, print server 101, address management server 103, login service PC 104, and directory service server 105 shown in FIG. 1 will be explained with reference to FIG. 2. FIG. 2 is a block diagram showing the hardware configuration of the information processing apparatus applicable to the client PC 100, print server 101, address management server 103, login service PC 104, and directory service server 105 shown in FIG. 1.

Referring to FIG. 2, a CPU 201 comprehensively controls respective devices and controllers connected to a system bus 204. A ROM 202 or external memory 211 stores a BIOS (Basic Input/Output System) and operating system program (to be referred to as OS) serving as control programs of the CPU 201, various programs necessary to implement functions to be executed by each server or each PC, and the like. A RAM 203 functions as a main memory, work area, and the like for the CPU 201. The CPU 201 loads, from the ROM 202 or external memory 211 into the RAM 203, programs and the like necessary to execute processing, and executes the loaded programs, implementing various operations. An input controller 205 controls inputs from a keyboard 209, a pointing device such as a mouse (not shown), and the like.

A video controller 206 controls display on a monitor 210. In general, the monitor 210 is a display device such as a liquid crystal display or CRT. The administrator uses such a display device, as needed. A memory controller 207 controls access to the external memory 211 such as a hard disk (HD), SSD (Solid State Drive), or SD memory card which stores a boot program, various applications, edit files, various data, and the like. A communication I/F controller 208 connects/communicates with an external device via a network (for example, the LAN 106 shown in FIG. 1), and executes network communication control processing. For example, communication using TCP/IP is possible. Note that the CPU 201 enables display on the monitor 210 by executing, for example, outline font rasterization processing to a display information area in the RAM 203.

The CPU 201 enables a user instruction with a mouse cursor (not shown) on the monitor 210. Various programs (to be described later) for implementing the present invention are recorded in the external memory 211, and if necessary, loaded into the RAM 203 and executed by the CPU 201. The external memory 211 additionally stores definition files, various information tables, and the like used to execute the programs, which will also be described in detail later.

[Controller Unit]

Figure 3:
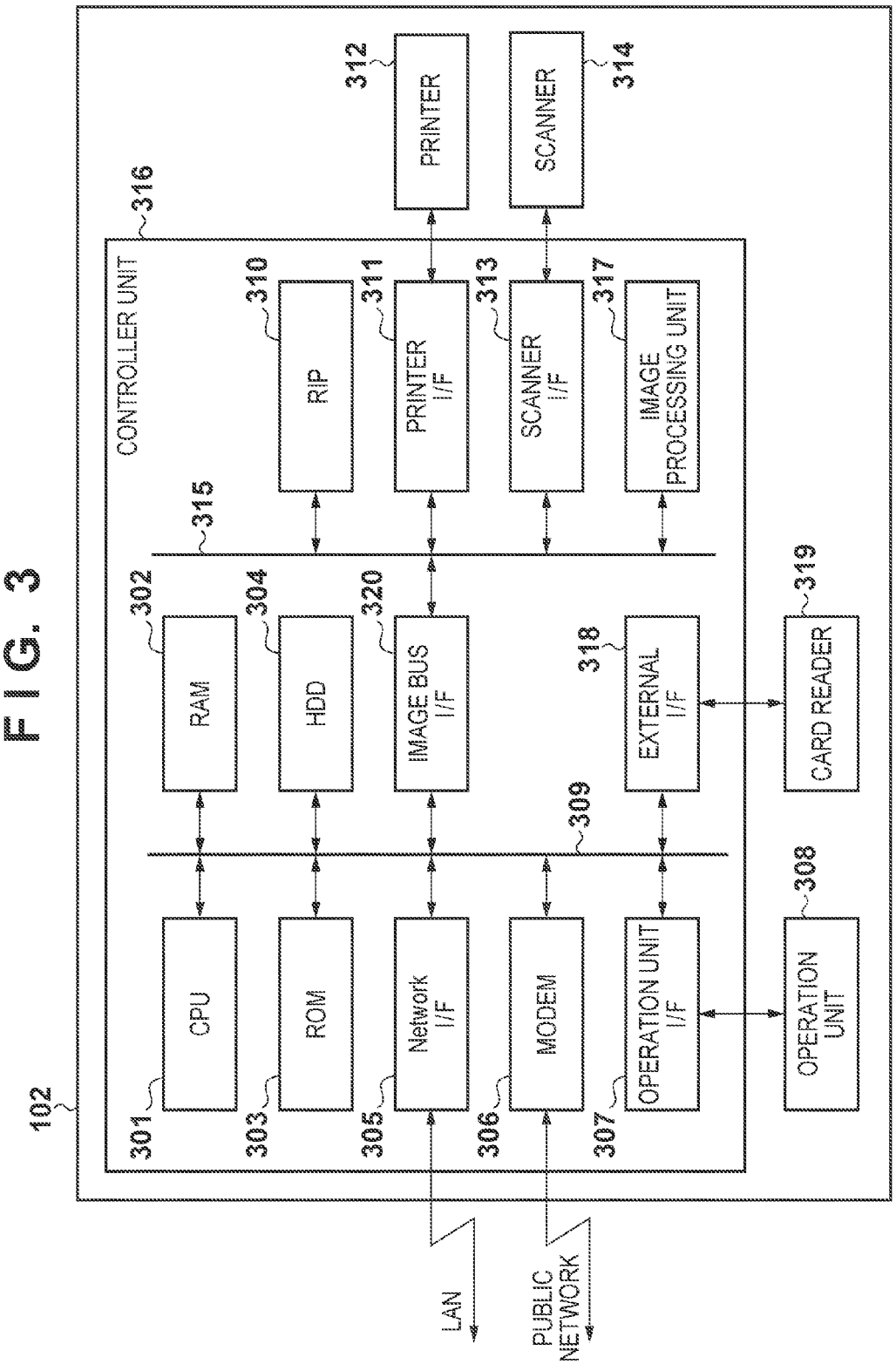
FIG. 3 is a block diagram exemplifying the configuration of the controller unit of a multi-function peripheral.

The hardware configuration of a controller unit which controls the multi-function peripheral 102 shown in FIG. 1 will be explained with reference to FIG. 3. FIG. 3 is a block diagram exemplifying the hardware configuration of the controller unit of the multi-function peripheral 102 shown in FIG. 1. Referring to FIG. 3, a controller unit 316 is connected to a scanner 314 functioning as an image input device and a printer 312 functioning as an image output device. In addition, the controller unit 316 is connected to a LAN (for example, the LAN 106 shown in FIG. 1) and a public line (WAN) (for example, PSTN or ISDN) to input/output image data and device information. In the controller unit 316, a CPU 301 is a processor which controls the overall system. A RAM 302 is a system work memory necessary for the CPU 301 to run, and is also a program memory for recording programs and an image memory for temporarily recording image data. A ROM 303 stores a boot program and various control programs for the system. A hard disk drive (HDD) 304 stores various programs for controlling the system, image data, and the like. In the embodiment, the HDD or save area 304 saves a PDL job.

An operation unit interface (I/F) 307 is an interface with an operation unit (UI) 308, and outputs, to the operation unit 308, image data to be displayed on the operation unit 308. Also, the operation unit I/F 307 notifies the CPU 301 of information (for example, user information) input by the system user via the operation unit 308. Note that the operation unit 308 includes a display unit having a touch panel. The user presses (touches with his finger or the like) a button displayed on the display unit to input various instructions. A network interface (I/F) 305 is connected to a network (LAN) to input/output data. A modem 306 is connected to a public line to perform data input/output such as FAX transmission/reception. An external interface (I/F) 318 receives an external input via a USB, IEEE1394, printer port, RS-232C, or the like. In the embodiment, a card reader 319 is connected to the external I/F 318 to read an IC card necessary for authentication. The CPU 301 controls reading of information from the IC card by the card reader 319 via the external I/F 318, and can acquire the information read from the IC card. These devices are arranged on a system bus 309.

An image bus interface (I/F) 320 is a bus bridge which connects the system bus 309 and an image bus 315 for transferring image data at high speed, and converts the data structure. The image bus 315 is formed from a PCI bus or IEEE1394 bus. The following devices are connected to the image bus 315. A raster image processor (RIP) 310 rasterizes vector data such as a PDL code into a bitmap image. A printer interface (I/F) 311 connects the printer 312 and controller unit 316, and performs synchronous/asynchronous conversion of image data. A scanner interface (I/F) 313 connects the scanner 314 and controller unit 316, and performs synchronous/asynchronous conversion of image data. An image processing unit 317 performs correction, processing, and editing for input image data, and performs printer correction, resolution conversion, and the like for printout image data. In addition, the image processing unit 317 rotates image data, and compresses/decompresses multi-valued image data by JPEG or binary image data by JBIG, MMR, MH, or the like.

The scanner 314 illuminates an image on a document sheet, and scans it with a CCD line sensor to convert it into an electrical signal as raster image data. The user sets document sheets in the tray of a document feeder, and designates the start of reading from the operation unit 308. Then, the CPU 301 gives an instruction to the scanner 314, and the feeder feeds the document sheets one by one to read document images. The printer 312 converts raster image data into an image on a sheet. The method of the printer 312 is, for example, an electrophotographic method using a photosensitive drum or photosensitive belt, or an inkjet method of discharging ink from a small nozzle array to directly print an image on a sheet. The type of apparatus is arbitrary as long as the present invention is applicable. The print operation starts in response to an instruction from the CPU 301. Note that the printer 312 includes a plurality of paper feed stages and corresponding paper cassettes so that different paper sizes or different orientations can be selected.

The operation unit 308 includes an LCD display unit, and a touch panel sheet is adhered onto the LCD. The operation unit 308 displays a system operation window, and when the user presses a displayed key, notifies the CPU 301 via the operation unit I/F 307 of the position information. The operation unit 308 includes various operation keys such as a start key, stop key, ID key, and reset key. The start key of the operation unit 308 is used to, for example, start a document image reading operation. An LED of two, green and red colors is arranged at the center of the start key, and the color represents whether the start key is usable. The stop key of the operation unit 308 is used to stop a running operation. The ID key of the operation unit 308 is used to input the user ID. The reset key is used to initialize settings from the operation unit.

The card reader 319 reads information stored in an IC card (for example, FeliCa® available from Sony) under the control of the CPU 301, and notifies the CPU 301 via the external I/F 318 of the read information. With this configuration, the multi-function peripheral 102 can transmit image data scanned by the scanner 314 to the LAN 106, and use the printer 312 to print out print data received from the LAN 106. Also, the multi-function peripheral 102 can FAX-send image data scanned by the scanner 314 to the public line via the modem 306, and use the printer 312 to output image data FAX-received from the public line.

[Pull Print Processing Sequence]

An overall pull print sequence in the printing system according to the embodiment will be explained with reference to FIG. 4. Before this, preconditions to execute pull print in the embodiment will be explained first. A virtual printer driver for implementing pull print in the embodiment is installed as a shared printer in the print server 101. The virtual printer driver has a function of generating print data based on designated printing or output of a rendering instruction from a client application 400. Further, the virtual printer driver has a function (user interface) of receiving setting of print setting information to control the functions of the printer driver and printer, and a function of storing the print setting information in an external storage device for each installed logical printer. The print setting information is stored in a DEVMODE structure for Windows® available from Microsoft, USA. The DEVMODE structure is defined by Microsoft, USA to store various settings including default operation conditions regarding a logical printer, such as functions usable by a printer, layout setting, finishing setting, paper feed/discharge setting, and print quality setting. This information is stored in the external storage device for each installed logical printer. Each client PC 100 downloads a virtual printer driver from the print server 101 by point & print or the like, and installs it, thereby adding the logical printer of a virtual printer driver 401.

The overall pull print sequence according to the embodiment will be described. FIG. 4 is a schematic view for explaining the overall sequence of Pull Print® in the printing system according to the embodiment. As shown in FIG. 4, the user first logs into the client PC 100, and inputs a print instruction from the client application 400 executed by the client PC 100 to a logical printer corresponding to the virtual printer driver 401 (1-1). At this time, the user can set print setting information using the virtual printer driver. Note that print setting information settable here is not one specialized to a specific printing apparatus and is limited to general-purpose contents. For example, the print setting information is one all printers can cope with. In accordance with the print instruction, the client application 400 of the client PC 100 transmits data to the virtual printer driver 401 via a graphic engine. The virtual printer driver 401 of the client PC 100 generates a device-independent EMFSPOOL print job based on the data received from the client application via the graphic engine (not shown). The client PC 100 transmits the generated EMFSPOOL print job to the print server 101 (1-2).

In the print server 101, a print processor 402 reads the EMFSPOOL print job transmitted from the virtual printer driver 401, and generates metadata of the print job. The print processor 402 transmits the metadata and the print job to a job management service 403 (1-3). The job management service 403 saves the EMFSPOOL print job in a predetermined storage location in the print server 101. Further, the job management service 403 registers the metadata in a job management DB 404 (built in the external storage device of the print server 101) (1-4). At this time, the print server 101 only saves the EMFSPOOL print job in the predetermined storage location without transmitting it to the printing apparatus. Further, the print server 101 transmits a print job identifier and user identifier to register them in an address management service 405 in the address management server 103 (1-5).

Upon receiving the print job identifier and user identifier from the job management service 403, the address management service 405 registers them in an address management DB 406 in addition to the address of the print server 101 (1-6). In the embodiment, the address management DB 406 is built in the external storage device of the address management server 103. Note that the embodiment uses an IP address as an address for discriminating a device. The embodiment uses a GUID (Global Unique Identifier) as the job identifier.

When the multi-function peripheral 102 detects an IC card readable by the card reader 319, it reads individual authentication information in the IC card, and transmits the read individual authentication information as an authentication request to an authentication server (not shown). The individual authentication information is information used for authentication and may be the serial number of the IC card. The individual authentication information is not particularly limited as long as it can uniquely identify a user. Upon receiving the individual authentication information from the multi-function peripheral 102, the authentication server performs authentication processing for the individual authentication information based on an IC card authentication table stored in the external storage device of the authentication server, and sends back the authentication result to the multi-function peripheral 102. Assume that the authentication server transmits the user identifier of the client PC 100 as the authentication result if the authentication processing is successful. A device having this function is arbitrary as long as the authentication server function can be implemented, and may reside in, for example, the address management server 103.

A panel application 407 in the multi-function peripheral 102 receives the authentication result (login user identifier of the client PC 100) indicating that authentication is successful. The embodiment uses a user name as the user identifier. Needless to say, the method for identifying a user may be the serial number of an IC card or the like.

The panel application 407 requests a print job list of the print server 101. Before this, the panel application 407 executes preprocessing to acquire the IP address of the print server 101 in order to acquire a print job list. First, the panel application 407 transmits a user identifier to the address management service 405 in the address management server 103 (2-1). This implements an address solution instruction unit. The address management service 405 acquires, from the address management DB 406, the address of a print server 101 corresponding to the received user name (2-2). Then, the address management service 405 sends back the address of the print server 101 to the panel application 407 (2-3). By receiving the address, the panel application 407 implements an address reception unit.

Upon receiving the address of the print server 101 from the address management service 405, the panel application 407 requests a print job list of the job management service 403 in the print server 101 based on the acquired address (2-4). Accordingly, the panel application 407 implements a list request transmission unit. By receiving the print job list request, the job management service 403 implements a list request receiving unit. The job management service 403 looks up the job management DB 404 (2-5), generates a print job list corresponding to the user name, and sends back the print job list to the panel application 407 (2-6). This implements a list transmission unit. By receiving the print job list, the panel application 407 implements a list receiving unit. Upon receiving the print job list from the job management service 403, the panel application 407 displays the print job list on the UI of the operation unit 308.

When the user selects a print job and issues a print setting information change instruction and print instruction, the panel application 407 transmits print setting information of the selected print job to the job management service 403 (3-1). This implements a setting change transmission unit. By receiving the change of print setting information, the job management service 403 implements a setting change receiving unit. Upon receiving the print setting information from the panel application 407, the job management service 403 looks up the job management DB 404 (3-2). The job management service 403 changes general-purpose print setting information set in the client PC to the print setting information received from the panel application 407, and sends back the changed print setting information to the panel application 407 (3-3). This implements a setting transmission unit. By receiving the transmitted print setting information, the panel application 407 implements a setting receiving unit. The panel application 407 compares the transmitted print setting information with the received one to determine whether the print setting information has been changed correctly. If the print setting information has not been changed correctly, the panel application 407 displays a message to this effect on the UI of the operation unit 308.

The panel application 407 issues again a print request (output instruction) to the job management service 403 (4-1). This implements a print request transmission unit. By receiving the print request, the job management service 403 implements a print request receiving unit. Upon receiving the print instruction from the panel application 407, the job management service 403 looks up the job management DB 404 and acquires information necessary to print (4-2). Then, the job management service 403 acquires an EMFSPOOL print job based on the information acquired from the job management DB 404 to execute print processing based on the print instruction. The job management service 403 issues, to the printer driver, an instruction about PDL conversion processing or the like for the print job (4-3). In this case, the job management service 403 instructs, about PDL conversion processing, the printer driver of the printer which has issued the print request. This specification assumes that the printer driver of each device has been installed in advance in the print server, but the present invention is not limited to this.

After that, the printer driver 408 transmits the PDL job to the multi-function peripheral 102, and the multi-function peripheral 102 prints (4-4). This implements a job transmission unit. Note that the PDL job is a job obtained by converting an EMFSPOOL print job into the printable PDL format. The job converted into the PDL format can be output by the multi-function peripheral 102.

Finally, when the user designates deletion of a print job, the panel application 407 instructs the job management service 403 to delete the designated print job (5-1). Upon receiving the print job deletion request from the panel application 407, the job management service 403 instructs the address management service 405 to delete a registered print job identifier (5-2). Upon receiving the print job identifier registration release request from the job management service 403, the address management service 405 deletes a corresponding record from the address management DB 406 (5-3). The job management service 403 deletes a corresponding record from the job management DB (5-4), and deletes an EMFSPOOL print job file as well.

The overall sequence of the printing system has been described. FIGS. 5A and 5B show details of data in the printing system of FIG. 4 in the table form. Processing will be described in detail with reference to flowcharts. At this time, the description will be complemented with reference to FIGS. 5A and 5B.

[Print Instruction Operation]

Figure 6:
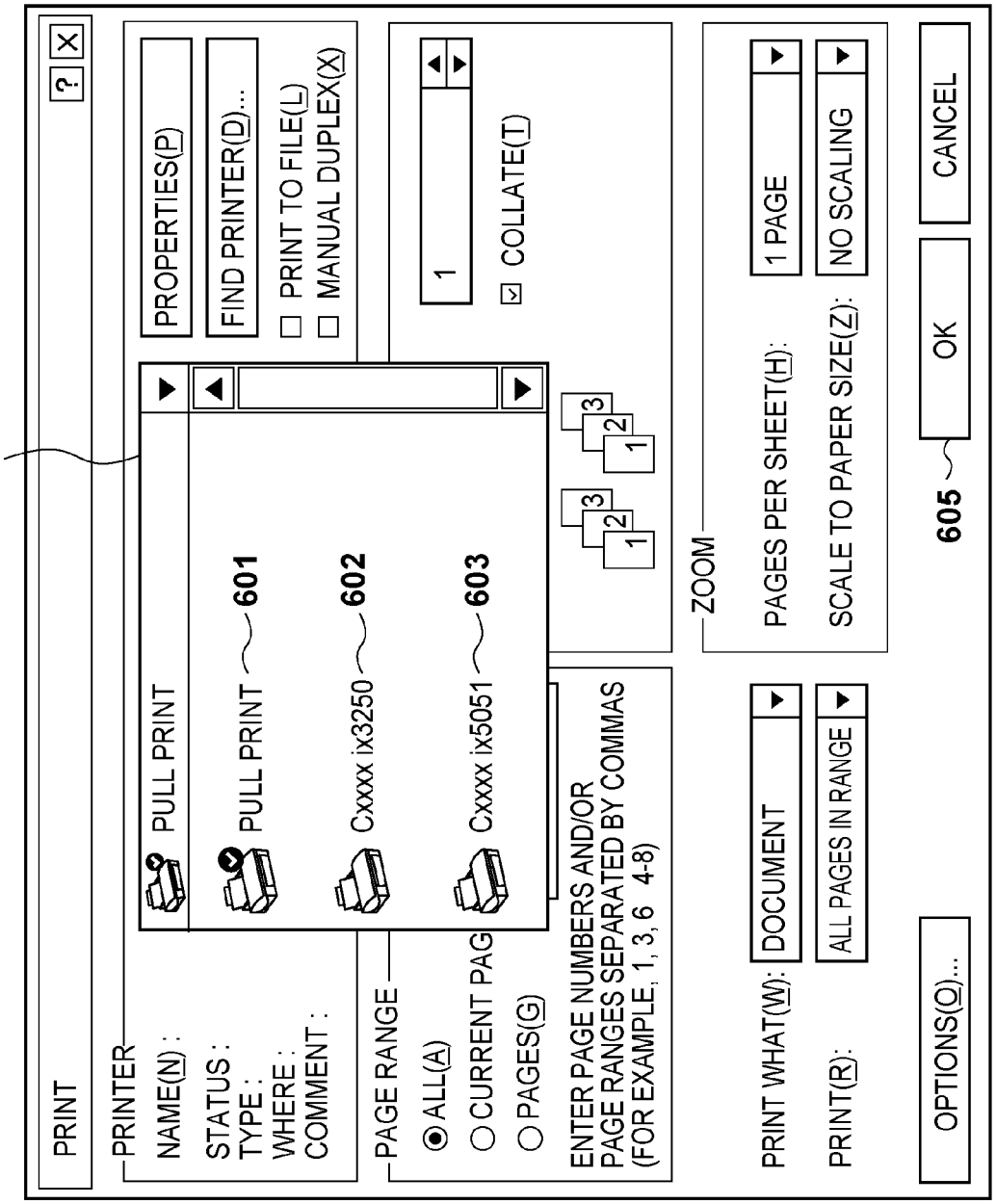
FIG. 6 is a schematic view exemplifying the print window of an application program.

A print instruction in the client application 400 running on the client PC 100 shown in FIG. 1 will be explained. FIG. 6 is a schematic view exemplifying the print window of the client application 400 running on the client PC 100 shown in FIG. 1. The display unit displays the print window under the control of the CPU of the client PC 100. A printer selection field 610 allows the user to select a logical printer to print from logical printers set in the client PC 100.

In the printer selection field 610, "pull print" 601 is a logical printer corresponding to a virtual printer driver set for pull print in the embodiment. Further in the printer selection field 610, "Cxxxx ix3250" 602 and "Cxxxx ix5051" 603 are logical printers corresponding to normal printer drivers. The user selects one logical printer in the printer selection field 610, and designates an OK button 605 with a pointing device (not shown). Then, the client application 400 transmits print data via the graphic engine to a printer driver corresponding to the logical printer selected in the printer selection field 610. The operation of the virtual printer driver when the user selects the "pull print" 601 in the printer selection field 610 and issues a print instruction will be explained.

[First Control Processing]

Figure 7B:
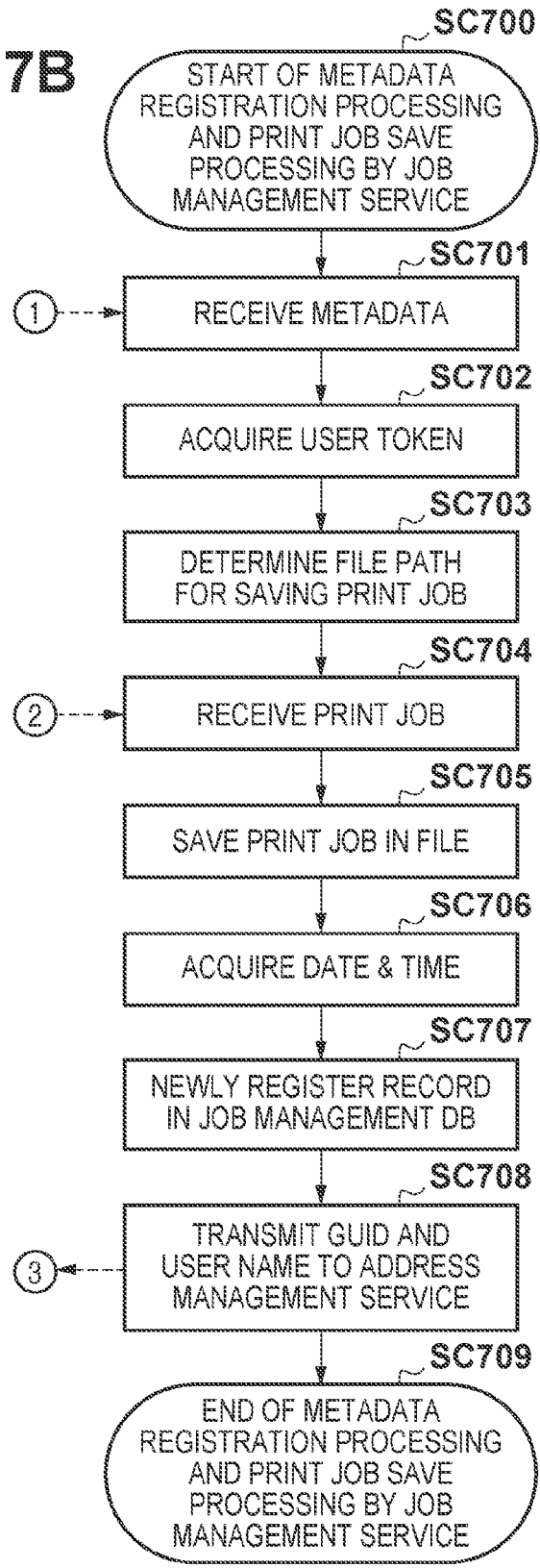

FIGS. 7A and 7B are flowcharts exemplifying the first control processing sequence in the printing system according to the present invention. This sequence corresponds to the processing sequence from 1-1 to 1-6 shown in FIG. 4. In the flowchart shown in FIGS. 7A and 7B, solid arrows indicate the sequence of processes, and broken arrows indicate data transmission/reception between apparatuses.

Figure 4:
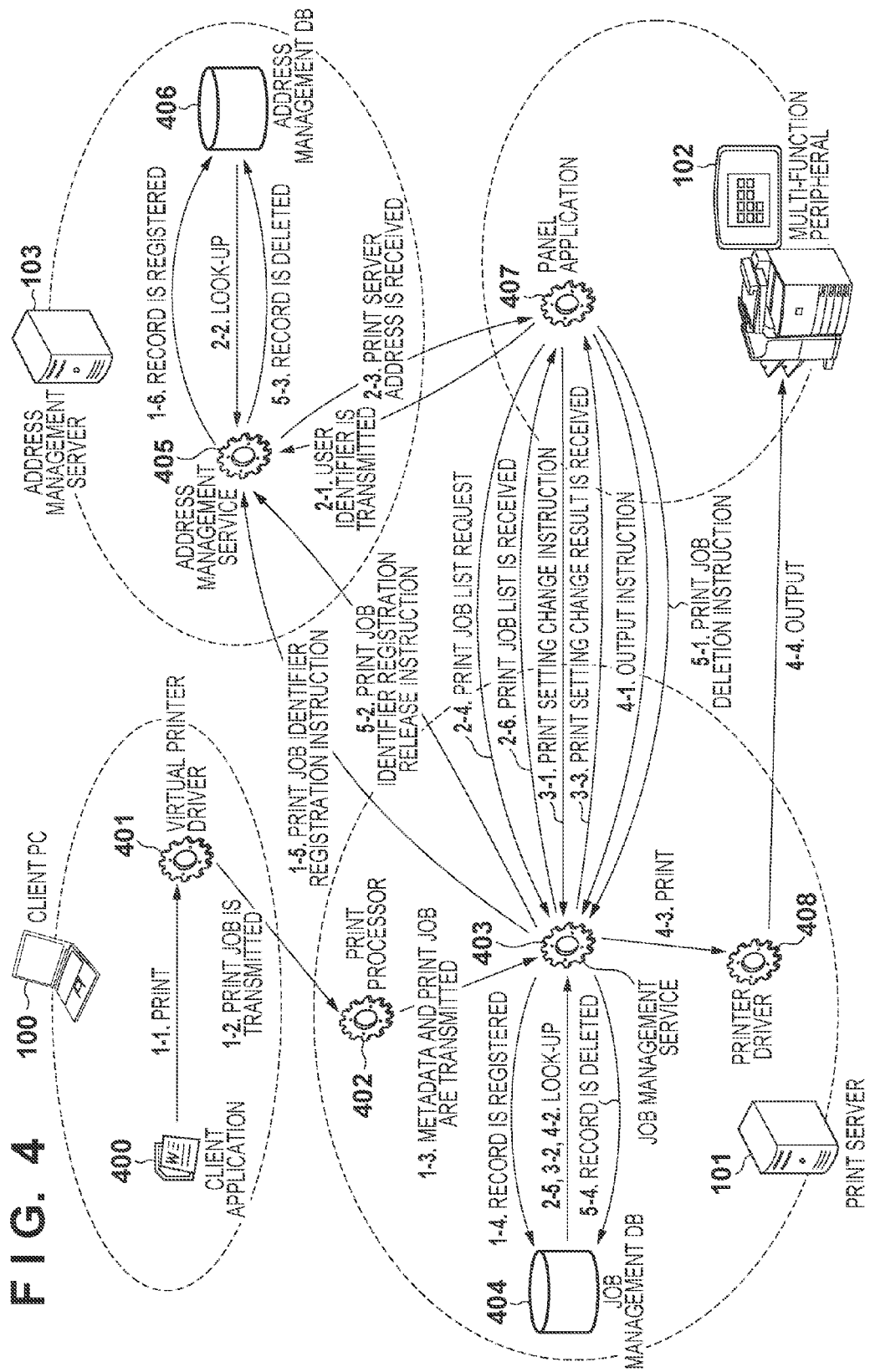
FIG. 4 is a schematic view for explaining an overall pull print sequence in the printing system.

Steps SA700 to SA702 correspond to print job input processing by the virtual printer driver 401 shown in FIG. 4. These flowchart processes are implemented by loading a program stored in the external memory into the RAM and executing it by the CPU of the client PC 100 shown in FIG. 1.

Steps SB700 to SB706 correspond to metadata generation/transmission processing and print job transfer processing by the print processor 402 shown in FIG. 4. These flowchart processes are implemented by loading a program stored in the external memory into the RAM and executing it by the CPU of the print server 101 shown in FIG. 1.

Steps SC700 to SC709 correspond to metadata registration processing and print job save processing by the job management service 403 shown in FIG. 4. These flowchart processes are implemented by loading a program stored in the external memory into the RAM and executing it by the CPU of the print server 101 shown in FIG. 1.

Steps SD700 to SD704 correspond to print job identifier registration processing by the address management service 405 shown in FIG. 4. These flowchart processes are implemented by loading a program stored in the external memory into the RAM and executing it by the CPU of the address management server 103 shown in FIG. 1.

First, print job input processing by the virtual printer driver 401 of the client PC 100 will be explained. In step SA700, processing by the virtual printer driver 401 starts. In step SA701, the virtual printer driver 401 outputs data input from the client application 400 in FIG. 4 as an EMFSPOOL print job. This corresponds to 1-1 and 1-2 in FIG. 4. For Windows® available from Microsoft, USA, input to the printer driver is executed by a function call by the OS (Operating System) which is called DDI (Device Driver Interface).

The virtual printer driver 401 interprets a parameter transferred at the same time as the DDI call, generates an EMFSPOOL print job, and outputs the generated job to a spooler managed by the OS. In general, the role of the printer driver is to generate and output a print job dependent on an output device. In the embodiment, it is important to generate and output a print job of an intermediate format independent of the multi-function peripheral 102. Hence, even if the configuration of the multi-function peripheral 102 is changed, that of the virtual printer driver 401 does not change in the printing system of the present invention. That is, a function unique to the multi-function peripheral can be easily used in the pull print system. In step SA702, the process ends.

Next, metadata generation/transmission processing and print job transfer processing by the print processor 402 of the print server 101 will be explained. For Windows® available from Microsoft, USA, internal processing by a PrintDocumentOnPrintProcessor function called when the OS requests the print processor to process a print job will be described. In step SB700, the print processor 402 starts processing on the print server 101. In step SB701, the print processor 402 acquires information about the format of a print job which has been output from the virtual printer driver 401 and managed by the OS. The print processor 402 determines whether the type of job output to the spooler of the OS is the RAW format. The RAW format indicates a print job output from the printer driver. Since the virtual printer driver 401 has output the print job in step SA701, it is determined that the job type is the RAW format, and the process advances to step SB702. If it is determined that the job type is not the RAW format, the process advances to step SB706 and ends. In step SB702, the print processor 402 generates metadata.

Metadata includes the GUID (Global Unique Identifier), job name, user name, DEVMODE, and logical printer name of the virtual printer driver on the "transmission data" column on the "1-3" row in FIGS. 5A and 5B. More specifically, the metadata is expressed in the XML format as shown in FIG. 13A. The Guid attribute of the JobInfo element describes a print job identifier which is unique in the printing system of the present invention. The JobName attribute of the JobInfo element describes the name of a job designated in process 1-1 of FIG. 4. The UserName attribute of the JobInfo element describes the name of a user who printed in process 1-1 of FIG. 4. The PrintQueueName attribute of the JobInfo element describes the name of a logical printer used in process 1-1 of FIG. 4. The DEVMODESnapshot attribute of the DocumentSettings element describes print setting information (DEVMODE) of the first page designated in process 1-1 of FIG. 4. Note that the DEVMODE is a binary format, and is converted into a text by a Base64 method to describe data by XML.

In step SB703, the print processor 402 transmits the metadata generated in step SB702 to the job management service 403. For Windows® available from Microsoft, USA, a named pipe can be used as a transmission protocol efficiently. The use of the named pipe is convenient even for acquisition of a user token (to be described later). In step SB704, the print processor 402 loads spool data from the spooler of the OS. The spool data corresponds to the EMFSPOOL print job output from the virtual printer driver 401. In step SB705, the print processor 402 transmits the loaded spool data to the job management service 403. In step SB706, the process ends.

Metadata registration processing and print job save processing by the job management service 403 will be described. In step SC700, the job management service 403 starts processing on the print server 101. In step SC701, the job management service 403 functions as a named pipe server and receives the metadata transmitted from the print processor 402 in step SB703 in the XML format as shown in FIG. 13A. When establishing a connection with the print processor 402, the job management service 403 acquires the user token of a named pipe client (that is, the print processor 402) (step SC702). The usage of the user token will be described later.

In step SC703, the job management service 403 determines a file path for saving the print job. In step SC704, the job management service 403 receives the EMFSPOOL print job transmitted from the print processor 402 in step SB705. In step SC705, the job management service 403 saves the received EMFSPOOL print job with the file name determined in step SC703. In step SC706, the job management service 403 generates the current date & time as the print job input time.

In step SC707, the job management service 403 registers, as a new record in the job management DB 404 of FIG. 4, the metadata received in step SC701, the user token acquired in step SC702, the file name determined in step SC703, and the date & time generated in step SC706. In step SC708, the job management service 403 transmits a print job identifier registration command to the address management service 405. At this time, the job management service 403 transmits even the GUID and user name contained in the metadata received in step SC701. In step SC709, the process ends.

Next, print job identifier registration processing by the address management service 405 will be explained. In step SD700, the address management service 405 starts processing on the address management server 103. In step SD701, the address management service 405 receives the GUID and user name transmitted from the job management service 403 in step SC708. When establishing a connection with the job management service 403, the address management service 405 acquires the IP address of the print server 101 (step SD702). In step SD703, the address management service 405 registers, as a new record in the address management DB 406 of FIG. 4, the GUID and user name received in step SD701 and the IP address acquired in step SD702. In step SD704, the process ends.

[Second Control Processing]

Figure 8A:
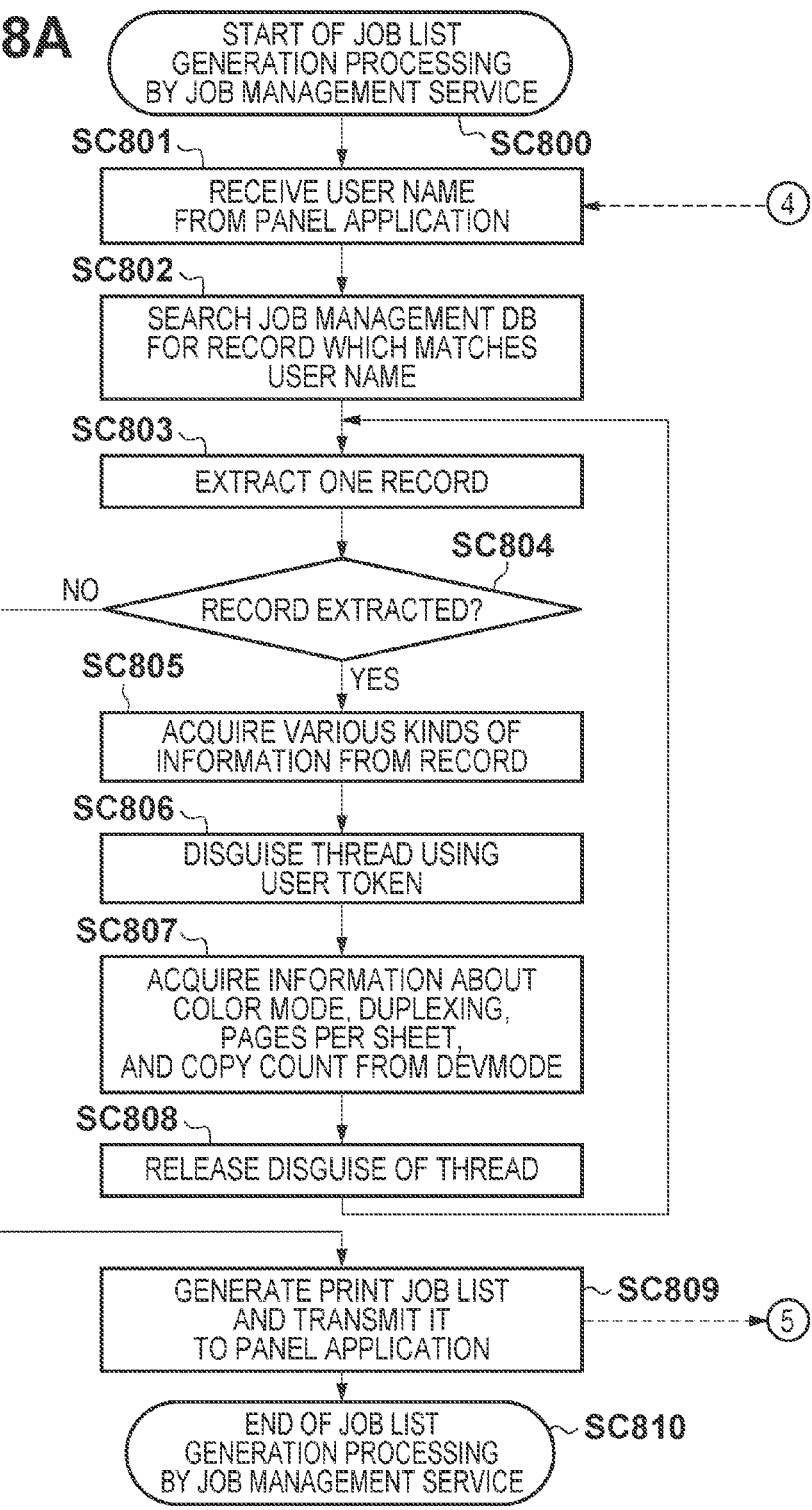
FIGS. 8A and 8B are flowcharts exemplifying the second control processing in the printing system.
Figure 8B:
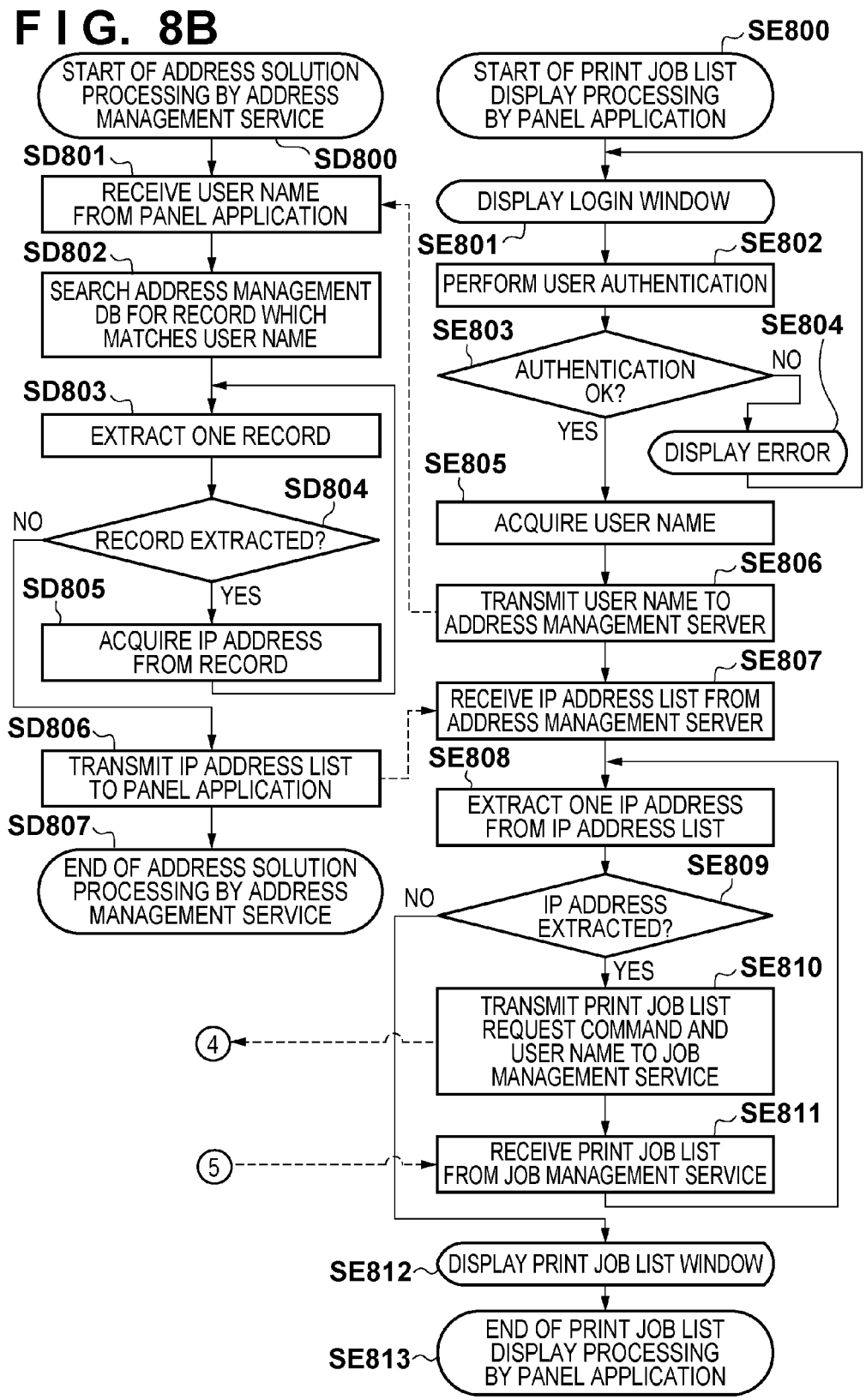

FIGS. 8A and 8B are flowcharts exemplifying the second control processing sequence in the printing system according to the present invention. This sequence corresponds to the processing sequence from 2-1 to 2-6 shown in FIG. 4. In the flowcharts shown in FIGS. 8A and 8B, solid arrows indicate the sequence of processes, and broken arrows indicate data transmission/reception between apparatuses.

Steps SE800 to SE813 correspond to print job list display processing by the panel application 407 shown in FIG. 4. These flowchart processes are implemented by loading a program stored in the external memory into the RAM and executing it by the CPU of the multi-function peripheral 102 shown in FIG. 1.

Steps SD800 to SD807 correspond to address solution processing by the address management service 405 shown in FIG. 4. These flowchart processes are implemented by loading a program stored in the external memory into the RAM and executing it by the CPU of the address management server 103 shown in FIG. 1.

Steps SC800 to SC810 correspond to print job list generation processing by the job management service 403 shown in FIG. 4. These flowchart processes are implemented by loading a program stored in the external memory into the RAM and executing it by the CPU of the print server 101 shown in FIG. 1.

First, print job list display processing by the panel application 407 will be explained. In step SE800, processing by the panel application 407 starts. In step SE801, the panel application 407 controls to display a login display window (FIG. 15A) on the operation unit 308. In step SE802, the panel application 407 performs user authentication based on an IC card or the like. In the embodiment, user authentication is not an important process, so a detailed description of an authentication card detection method, an IC card identification ID acquisition method, and authentication processing by an authentication server will be omitted.

In step SE803, the panel application 407 determines the authentication result. If the authentication result indicates an authentication error in step SE803, the panel application 407 controls in step SE804 to display an error display window (FIG. 15B) on the display unit of the operation unit 308. If the panel application 407 receives pressing of the OK button on the error display window, it returns to step SE801 and controls to display the login display window again. If the panel application 407 determines in step SE803 that authentication is successful, the process advances to step SE805. In step SE805, the panel application 407 acquires the name of a user who has been authenticated successfully. In step SE806, the panel application 407 transmits a user name to the address management service 405. In step SE807, the panel application 407 receives the IP address list of the print server 101 from the address management service 405. More specifically, the panel application 407 requests the address management service 405 to narrow down target print jobs based on the user name, and send back IP addresses of job management service at which the print jobs are held.

Subsequent steps SE808 to SE811 are loop processing of listing IP addresses from the IP address list. In step SE808, the panel application 407 extracts an IP address from the IP address list. In step SE809, the panel application 407 determines whether an IP address has been extracted. If an IP address has been extracted, the process advances to step SE810, and the panel application 407 transmits a print job list request command to the job management service 403. At this time, the user name is also transmitted. In step SE811, the panel application 407 receives a print job list from the job management service 403.

The print job list includes the GUID, job name, copy count, duplexing, color mode, pages per sheet, and date & time on the "transmission data" column on the "2-6" row in FIGS. 5A and 5B. More specifically, the print job list is expressed as print job list information in the XML format as shown in FIGS. 14A and 14B. The JobList element holds JobInfo child elements by the number of jobs. The Guid attribute of the JobInfo element is the same as Guid described with reference to FIG. 13A. The JobName attribute of the JobInfo element is also the same as JobName described with reference to FIG. 13A. However, various attributes held by the DocumentSettings element greatly differ from those in FIG. 13A.

The CopyCount attribute designates the number of copies. The Duplexing attribute designates which of one-sided printing and two-sided printing is used. More specifically, a description "OneSided" designates one-sided printing. A description "TwoSidedLongEdge" designates two-sided (long-edge binding). A description "TwoSidedShortEdge" designates two-sided (short-edge binding). The OutputColor attribute designates an output method regarding color. A description "Color" designates color. A description "Monochrome" designates monochrome. The PagesPerSheet attribute designates the number of pages which can be selected for printing on one surface of a sheet. The DateTime attribute designates the job input time.

After the panel application 407 ends extraction of an IP address from the IP address list in steps SE808 to SE811, the process advances to step SE812. In step SE812, the panel application 407 controls to display a print job list display window (FIG. 15C) on the display unit of the operation unit 308. In step SE813, the process ends.

Next, address solution processing by the address management service 405 will be explained. In step SD800, processing by the address management service 405 starts. In step SD801, the address management service 405 receives the user name transmitted from the panel application 407 in step SE806. In step SD802, the address management service 405 searches the address management DB 406 in FIG. 4 for a record which matches the user name received in step SD801. In step SD803, the address management service 405 extracts one record from detected records. In step SD804, the address management service 405 determines whether the record has been extracted. If the record has been extracted, the process advances to step SD805, and the address management service 405 extracts, from the record, the IP address of the print server 101 in which the job management service 403 runs. After the end of extracting IP addresses from all detected records in steps SD803 to SD805, the process advances to step SD806, and the address management service 405 sends back the IP address list to the panel application 407. In step SD807, the process ends.

Print job list generation processing by the job management service 403 will be explained. In step SC800, processing by the job management service 403 starts. In step SC801, the job management service 403 receives the print job list request transmitted from the panel application 407 in step SE810. At this time, the job management service 403 receives the user name, too. In step SC802, the job management service 403 searches the job management DB 404 in FIG. 4 for a record which matches the user name received in step SC801. In step SC803, the job management service 403 extracts one record from detected records.

In step SC804, the job management service 403 determines whether the record has been extracted. If the record has been extracted, the process advances to step SC805, and the job management service 403 extracts a GUID, a job name, a DEVMODE, the logical printer name of a virtual printer driver, a user token, and date & time from the record. In step SC806, the job management service 403 "disguises" its thread using the user token extracted in step SC805. While the thread is disguised, it is executed in the security context of a user who printed using the client application 400 in FIG. 4. That is, "disguise" indicates executing a thread with user authority using the security context of the user. "Thread" indicates a thread generated upon a change of print setting information.

In step SC807, the job management service 403 extracts pieces of information such as the color mode, duplexing, pages per sheet, and copy count from the DEVMODE extracted in step SC805. The DEVMODE is a printer driver-specific data format managed by the printer driver. To extract pieces of information from the DEVMODE, an inquiry need to be made to a printer driver which has generated the DEVMODE. Since the logical printer name of the virtual printer driver has been acquired in step SC807, pieces of information are extracted from the DEVMODE using the logical printer.

In general, pieces of information are extracted from the DEVMODE via an original expansion interface which is arranged in the printer driver to operate the DEVMODE. Recently, there is a method using an XML print setting storage format called a print ticket defined by Microsoft, USA. If the printer driver supports the print ticket, it is also possible to convert the DEVMODE into a print ticket and extract pieces of information from the print ticket.

In step SC808, the job management service 403 releases the disguise of the thread. After the end of extracting pieces of print setting information from all detected records in steps SC803 to SC808, the process advances to step SC809, and the job management service 403 generates a print job list (FIGS. 14A and 14B). The job management service 403 sends back the print job list to the panel application 407. In step SC810, the process ends.

[Third Control Processing]

Figure 9A:
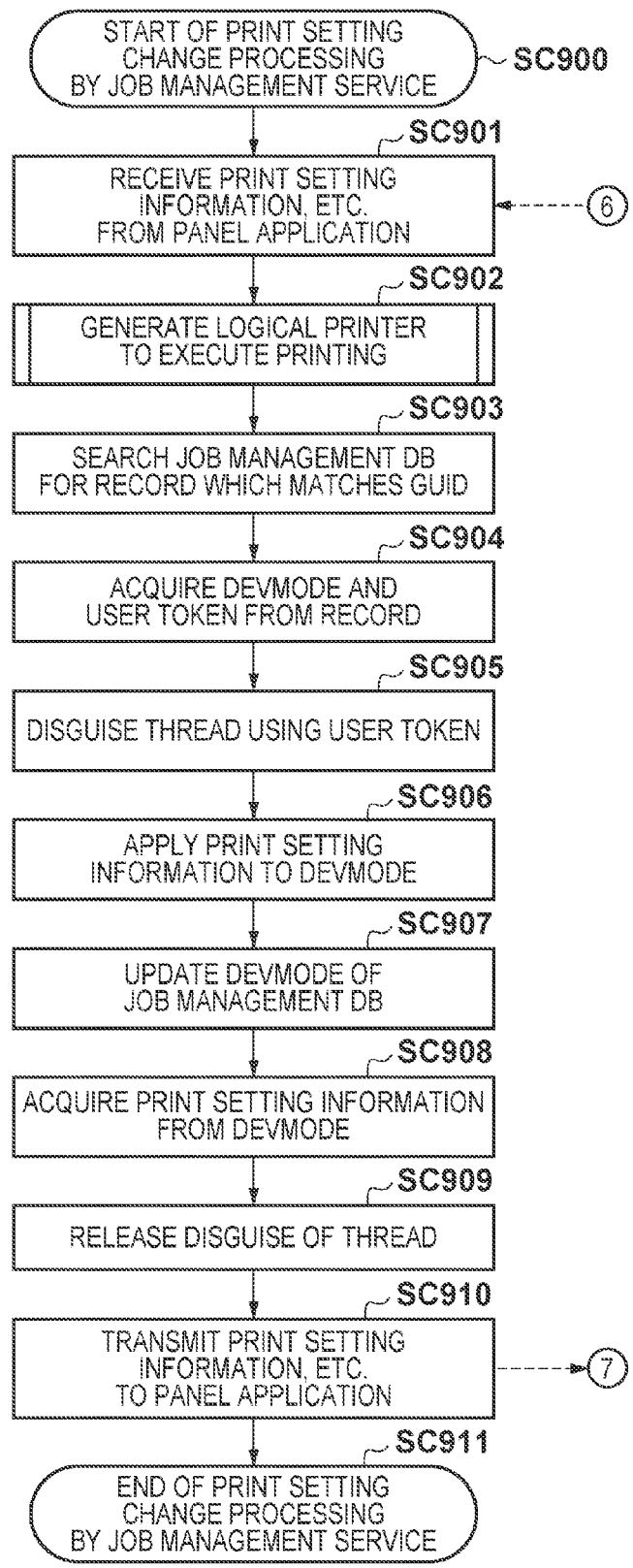

FIGS. 9A and 9B are flowcharts exemplifying the third control processing sequence in the printing system according to the present invention. This sequence corresponds to the processing sequence from 3-1 to 3-3 shown in FIG. 4. In the flowchart shown in FIGS. 9A and 9B, solid arrows indicate the sequence of processes, and broken arrows indicate data transmission/reception between apparatuses.

Steps SE900 to SE913 correspond to print setting information change confirmation and print instruction processing by the panel application 407 shown in FIG. 4. These flowchart processes are implemented by loading a program stored in the external memory into the RAM and executing it by the CPU of the multi-function peripheral 102 shown in FIG. 1.

Steps SC900 to SC911 correspond to print setting information change processing by the job management service 403 shown in FIG. 4. These flowchart processes are implemented by loading a program stored in the external memory into the RAM and executing it by the CPU of the print server 101 shown in FIG. 1.

First, print setting information change confirmation and print instruction processing by the panel application 407 will be explained. In step SE900, processing by the panel application 407 starts. In step SE812 of FIG. 8B, the panel application 407 controls to display the print job list display window (FIG. 15C) on the display unit of the operation unit 308.

In step SE901, the panel application 407 receives selection of a print job and pressing of a print button 1422 from the user. In step SE902, the panel application 407 controls to display a print setting information change window (FIG. 16A) on the display unit of the operation unit 308. A setting 1431 in FIG. 16A indicates designation of the color mode, and allows the user to check either monochrome or color. A setting 1432 in FIG. 16A indicates designation of two-sided/one-sided, and allows the user to select one imposition from one-sided, two-sided (long-edge binding), and two-sided (short-edge binding). A setting 1433 in FIG. 16A indicates designation of pages per sheet, and allows the user to select one of 1in1, 2in1, 4in1, 6in1, 8in1, 9in1, and 16in1. A setting 1434 in FIG. 16A indicates designation of the copy count, and allows the user to designate a value of 1 to 9,999. FIG. 16A exemplifies a change of print setting information upon receiving selection of a print job with a document name "statement of accounts" in FIG. 15C and pressing of the print button 1422.

In step SE903, the panel application 407 receives a change of print setting information from the user. Assume that the user has changed one-sided/two-sided designation at the setting 1432 in FIG. 16A from one-sided to two-sided (long-edge binding). In step SE904, the panel application 407 determines whether the print setting information has been changed. If no print setting information has been changed, the process skips subsequent print setting information change confirmation processing and advances to step SE911. If the print setting information has been changed, the process advances to step SE905. In step SE905, the panel application 407 transmits the print setting information to the job management service 403. The print setting information includes the GUID, copy count, duplexing, color mode, pages per sheet, and model name of the multi-function peripheral on the "transmission data" column on the "3-1" row in FIG. 5B.

More specifically, the print setting information is expressed in the XML format as shown in FIG. 13B. The Guid attribute of the JobInfo element is the same as Guid described with reference to FIG. 13A. The DeviceModelName attribute of the JobInfo element describes the model name of the multi-function peripheral 102 in FIG. 1. Various attributes held by the DocumentSettings element are the same as those described with reference to FIGS. 14A and 14B. However, one-sided has been changed to two-sided (long-edge binding) in step SE903, so the Duplexing attribute becomes "TwoSidedLongEdge". In step SE906, the panel application 407 receives, from the job management service 403, print setting information which reflects the print setting information change instruction. The print setting information includes the GUID, copy count, duplexing, color mode, and pages per sheet on the "transmission data" column on the "3-3" row in FIG. 5B. More specifically, the print setting information is expressed in the XML format as shown in FIG. 13C. The contents are almost the same as those in FIG. 13B, and a description thereof will not be repeated.

In step SE907, the panel application 407 compares the print setting information transmitted in step SE905 with one received in step SE906. As described above, the Duplexing attribute in the print setting information transmitted in step SE905 designates "TwoSidedLongEdge". However, assume that the Duplexing attribute in the print setting information received in step SE906 is "OneSided". Such a mismatch between transmitted and received settings is highly likely to occur in principle.

Setting information which is not changed in step SE903 is, for example, the paper size. Assume that the paper size is "postcard" in 1-1 of FIG. 4. As a print setting information prohibition condition, assume that two-sided/one-sided designation allows selection of only one-sided for paper "postcard". Further, the preferential order to apply the prohibition condition is higher for paper size designation than for two-sided/one-sided designation. Thus, the Duplexing attribute has to be always "OneSided". If the same advanced prohibition processing as that of the printer driver is implemented in the panel application 407, a change of duplexing designation can be prohibited in input of a setting change in FIG. 16A. However, this greatly complicates implementation of the panel application. It is therefore easy and versatile to inquire of the printer driver whether a change is possible every time print setting information is changed, without performing print setting information prohibition processing by the panel application 407, like the embodiment.

If the print setting information transmitted in step SE905 and one received in step SE906 are identical as a result of comparison, the process advances to step SE911. If they are different, the process advances to step SE908, and the panel application 407 controls to display an error display window (FIG. 16B) on the display unit of the operation unit 308. Since the Duplexing attribute of the print setting information received in step SE906 is "OneSided", the error display in FIG. 16B represents that a change from "one-sided" to "two-sided (long-edge binding)" has failed. In step SE909, the panel application 407 receives input of a print continuation instruction. In step SE910, the panel application 407 receives pressing of an OK button 1442, and the process advances to step SE911. Print instruction processing in step SE911 will be described later. After that, the process advances to step SE912. If the panel application 407 receives pressing of a cancel button 1441 via the error display window in FIG. 16B, the process advances to step SE912, and the panel application 407 closes the error display window in FIG. 16B and the print setting information change window in FIG. 16A. In step SE913, the process ends.

Next, print setting information change processing by the job management service 403 will be explained. In step SC900, processing by the job management service 403 starts. In step SC901, the job management service 403 receives print setting information transmitted from the panel application 407 in step SE905 in the XML format, as shown in FIG. 13B. In step SC902, the job management service 403 creates a logical printer to change print setting information. Details of this processing will be described later with reference to FIG. 10.

In step SC903, the job management service 403 searches the job management DB 404 in FIG. 4 for a record which matches the GUID received in step SC901. In step SC904, the job management service 403 acquires a DEVMODE and user token from the detected record. In step SC905, the job management service 403 disguises its thread using the user token acquired in step SC904. While the thread is "disguised", it is executed in the security context of a user who printed using the client application 400 in FIG. 4. In step SC906, the job management service 403 applies pieces of print setting information received in step SC901 to the DEVMODE acquired in step SC904. The DEVMODE is a printer driver-specific data format managed by the printer driver. To apply pieces of information to the DEVMODE, a printer driver which has generated the DEVMODE is requested to update the DEVMODE.

The logical printer has been generated in step SC902 of FIG. 9A and can be used to apply pieces of information to the DEVMODE. In general, pieces of information are applied to the DEVMODE via an original expansion interface which is arranged in the printer driver to operate the DEVMODE. Recently, there is a method using an XML print setting storage format called a print ticket defined by Microsoft, USA. If the printer driver supports the print ticket, it is also possible to convert the DEVMODE into a print ticket, apply pieces of information to the print ticket, and convert the print ticket into a DEVMODE.

In step SC907, the job management service 403 updates the DEVMODE saved in the job management DB 404 using the DEVMODE changed in step SC906. In step SC908, the job management service 403 extracts pieces of information such as the color mode, duplexing, pages per sheet, and copy count from the DEVMODE updated in step SC906. Extraction of pieces of information is the same as that in step SC807 of FIG. 8A. In step SC909, the job management service 403 releases the disguise of the thread. In step SC910, the job management service 403 sends back, to the panel application 407, the print setting information which has been changed into the XML format, as shown in FIG. 13C. In step SC911, the process ends.

[Logical Printer Creation Processing]

Figure 10:
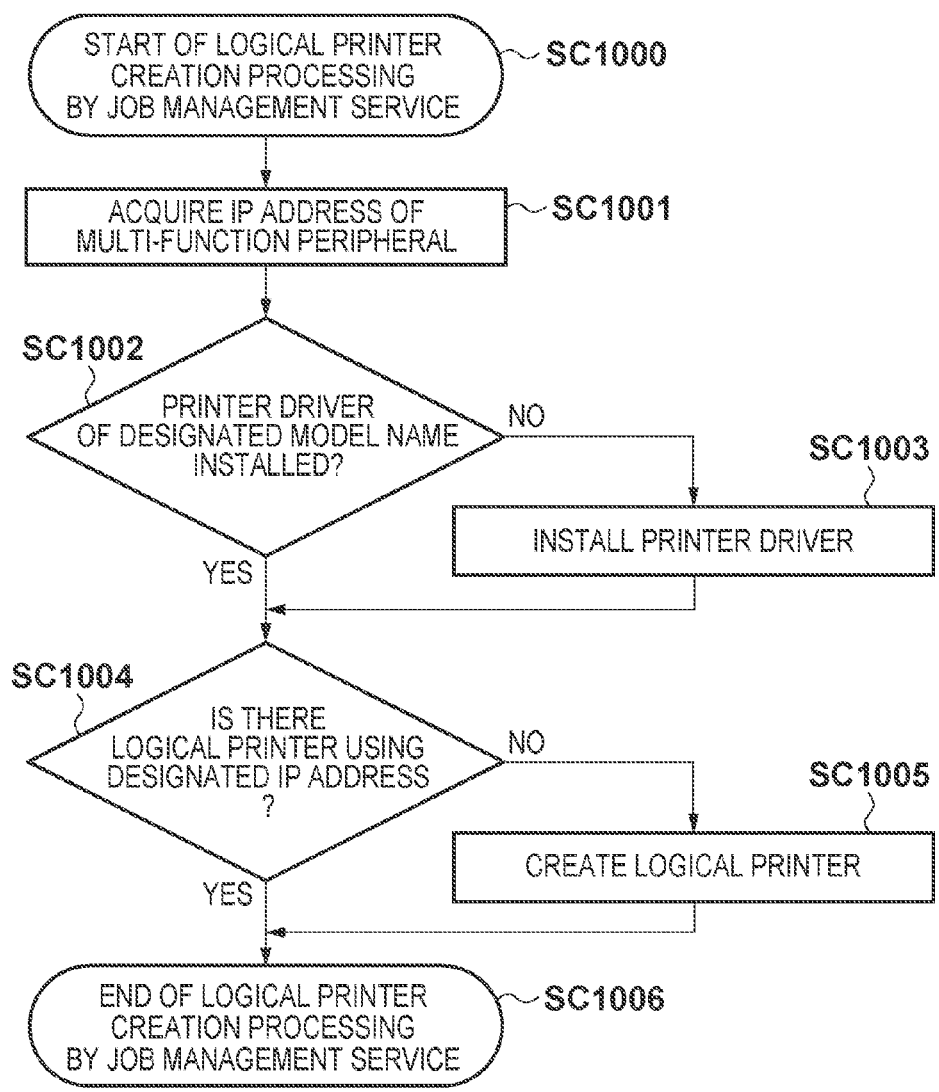
FIG. 10 is flowchart generating a logical printer in the printing system.

FIG. 10 is a flowchart showing logical printer creation processing called in step SC902 of FIG. 9A. In step SC1000, processing by the job management service 403 starts. In step SC1001, the job management service 403 acquires the IP address of the multi-function peripheral 102 in FIG. 1. The IP address of the multi-function peripheral 102 is acquired when a data transmission/reception connection with the panel application 407 is established. In step SC1002, the job management service 403 determines whether a printer driver which supports the model name of the multi-function peripheral 102 in FIG. 1 has been installed in the print server 101. If no such printer driver has been installed, the process advances to step SC1003, and the job management service 403 installs, in the print server 101, a printer driver which supports the model name of the multi-function peripheral 102 in FIG. 1. As a result, the print job can be converted into a format outputtable by a multi-function peripheral having the model name. The process then advances to step SC1004. If the job management service 403 determines in step SC1002 that such a printer driver has been installed, the process advances to step SC1004. At this stage, the installed printer driver is the printer driver 408 in FIG. 4.

In step SC1004, the job management service 403 determines whether a logical printer which is formed from the installed printer driver and has the IP address acquired in step SC1001 as an output port exists in the print server 101. If no such logical printer exists, the process advances to step SC1005. In step SC1005, the job management service 403 creates, by using the installed printer driver, a logical printer which has the IP address acquired in step SC1001 as an output port. The process then advances to step SC1006. If the job management service 403 determines in step SC1004 that such a logical printer exists, the process advances to step SC1006. In step SC1006, the process ends.

[Fourth Control Processing]

Figure 11:
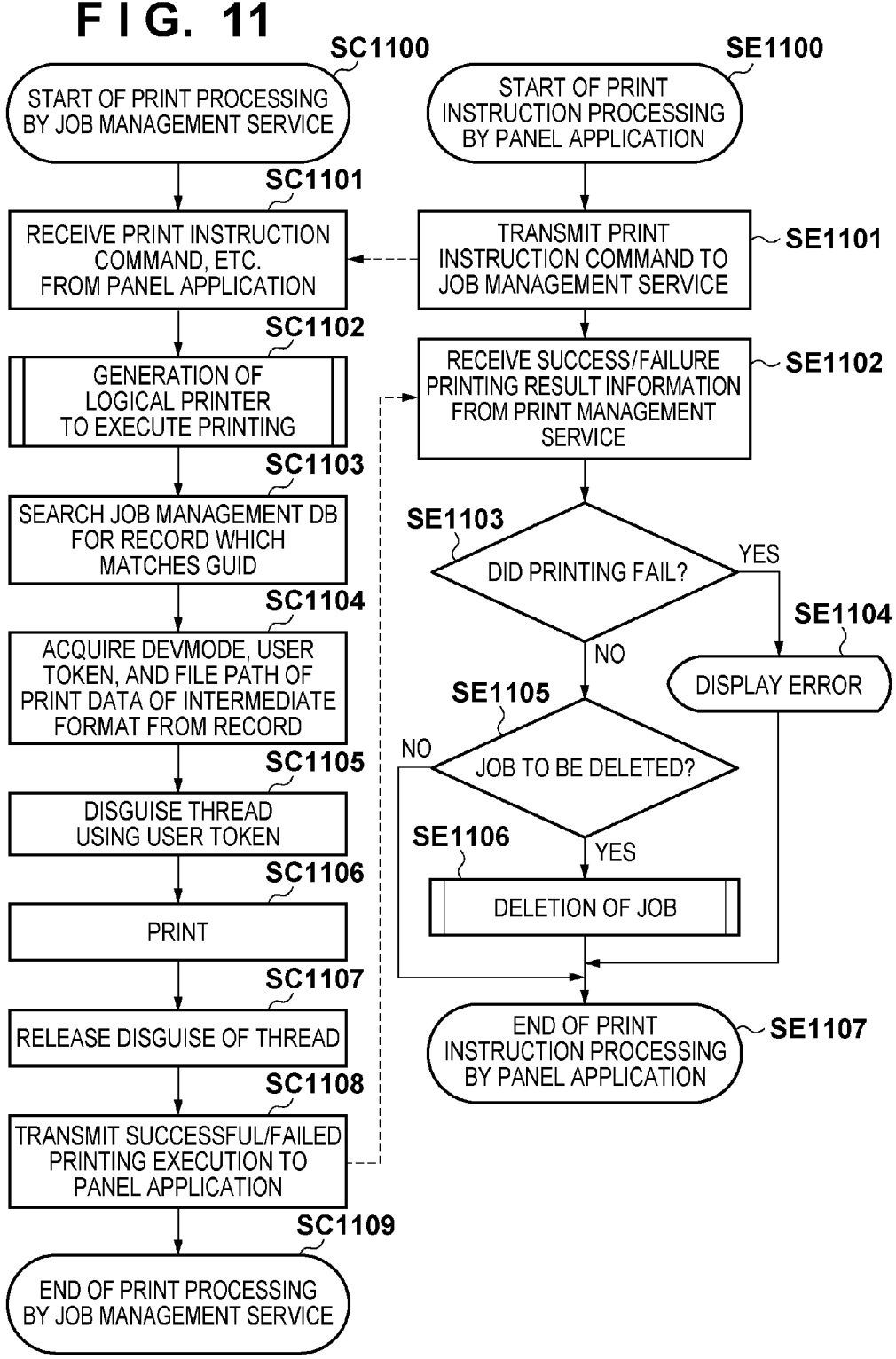
FIG. 11 is a flowchart exemplifying the fourth control processing in the printing system.

FIG. 11 is a flowchart exemplifying the fourth control processing sequence in the printing system according to the present invention, and is also a flowchart showing print instruction processing called in step SE911 of FIG. 9B. This sequence corresponds to the processing sequence from 4-1 to 4-4 shown in FIG. 4. In the flowchart shown in FIG. 11, solid arrows indicate the sequence of processes, and broken arrows indicate data transmission/reception between apparatuses.

Steps SE1100 to SE1107 correspond to print instruction processing by the panel application 407 shown in FIG. 4. These flowchart processes are implemented by loading a program stored in the external memory into the RAM and executing it by the CPU of the multi-function peripheral 102 shown in FIG. 1.

Steps SC1100 to SC1109 correspond to print processing by the job management service 403 shown in FIG. 4. These flowchart processes are implemented by loading a program stored in the external memory into the RAM and executing it by the CPU of the print server 101 shown in FIG. 1.

First, print instruction processing by the panel application 407 will be explained. In step SE1100, processing by the panel application 407 starts. In step SE1101, the panel application 407 transmits a print instruction request command, the GUID of a selected print job, and the model name of the multi-function peripheral 102 to the job management service 403. In step SE1102, the panel application 407 receives a printing execution result (success/failure) from the job management service 403. In step SE1103, the panel application 407 determines whether execution of printing is successful. If execution of printing has failed, the process advances to step SE1104, and the panel application 407 controls to display an error display window (FIG. 16C) on the display unit of the operation unit 308. The process then advances to step SE1107. If the panel application 407 determines in step SE1103 that execution of printing is successful, the process advances to step SE1105.

In step SE1105, the panel application 407 determines whether a printed document erase check box 1435 in FIG. 16A has been checked. If deletion after printing is designated, the process advances to step SE1106, and the panel application 407 deletes the print job. Details of this processing will be described later with reference to FIG. 12. The process then advances to step SE1107. In step SE1107, the process ends.

Next, print processing by the job management service 403 will be explained. In step SC1100, processing by the job management service 403 starts. In step SC1101, the job management service 403 receives the print instruction command transmitted from the panel application 407 in step SE1101. At this time, the job management service 403 also receives the GUID of the target print job and the model name of the multi-function peripheral 102. In step SC1102, the job management service 403 creates a logical printer to change execution of printing. The processing contents are the same as those in step SC902 of FIG. 9A. Details of this processing have been described with reference to FIG. 10. In step SC1103, the job management service 403 searches the job management DB 404 in FIG. 4 for a record which matches the GUID received in step SC1101. In step SC1104, the job management service 403 acquires an EMFSPOOL file name, DEVMODE, and user token from the detected record. Note that the DEVMODE acquired here is print setting information set using the window in FIG. 16A.

In step SC1105, the job management service 403 disguises its thread using the user token acquired in step SC1104. While the thread is disguised, it is executed in the security context of a user who printed using the client application 400 in FIG. 4. In step SC1106, the job management service 403 renders the EMFSPOOL and DEVMODE acquired in step SC1104 for the logical printer created in step SC1102, and executes print processing. In the job management service 403, the printer driver which forms the logical printer generates PDL and transmits it to the multi-function peripheral 102. In step SC1107, the job management service 403 releases the disguise of the thread. In step SC1108, the job management service 403 sends back a printing execution result (success/failure) to the panel application 407. In step SC1109, the process ends.

[Fifth Control Processing]

Figure 12:
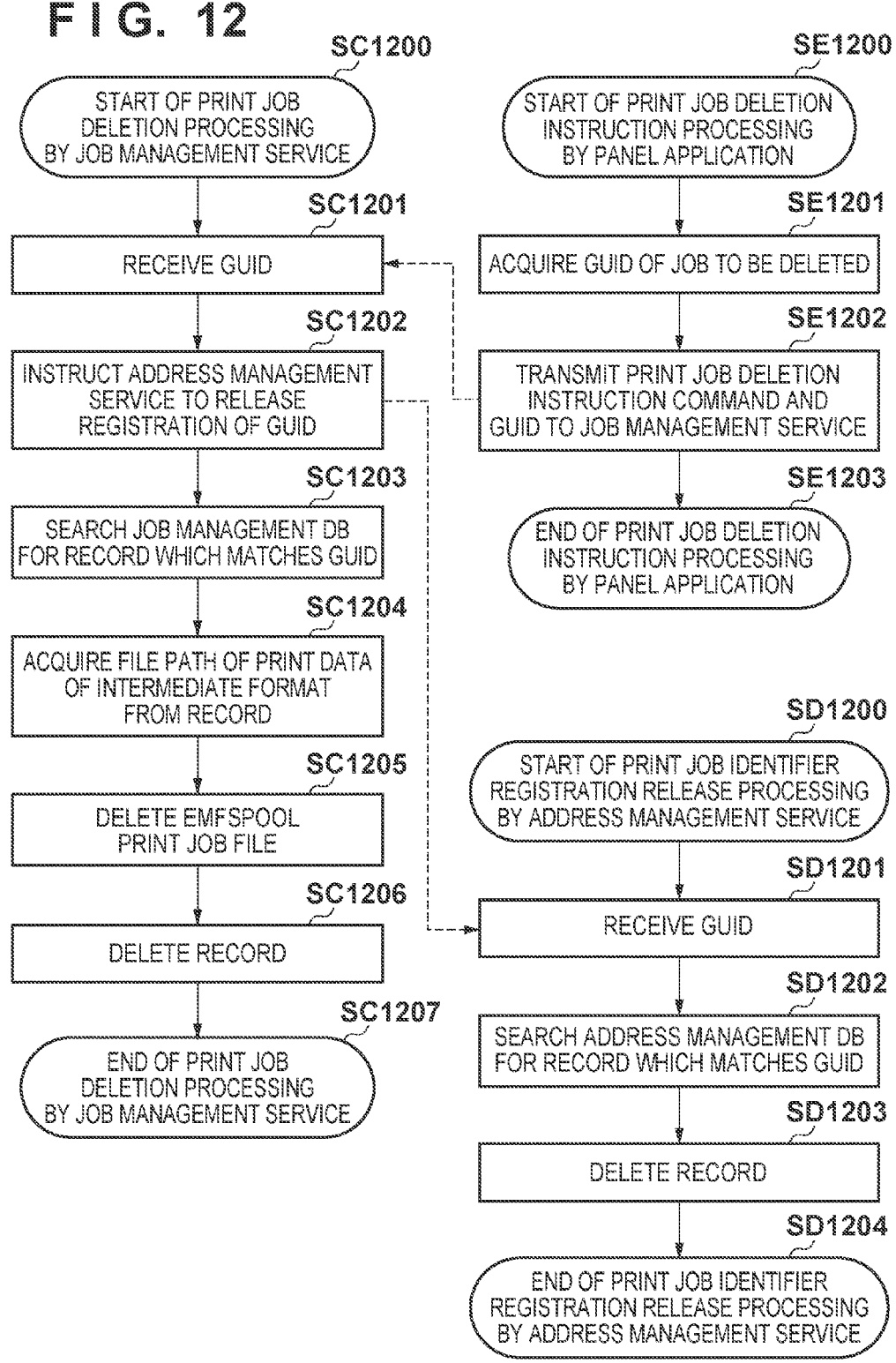
FIG. 12 is a flowchart exemplifying the fifth control processing in the printing system.

FIG. 12 is a flowchart exemplifying the fifth control processing sequence in the printing system according to the present invention. This sequence corresponds to the processing sequence from 5-1 to 5-4 shown in FIG. 4. In the flowchart shown in FIG. 12, solid arrows indicate the sequence of processes, and broken arrows indicate data transmission/reception between apparatuses.

Steps SE1200 to SE1203 correspond to print job deletion instruction processing by the panel application 407 shown in FIG. 4. These flowchart processes are implemented by loading a program stored in the external memory into the RAM and executing it by the CPU of the multi-function peripheral 102 shown in FIG. 1.

Steps SC1200 to SC1207 correspond to print job deletion processing by the job management service 403 shown in FIG. 4. These flowchart processes are implemented by loading a program stored in the external memory into the RAM and executing it by the CPU of the print server 101 shown in FIG. 1.

Steps SD1200 to SD1204 correspond to print job identifier registration release processing by the address management service 405 shown in FIG. 4. These flowchart processes are implemented by loading a program stored in the external memory into the RAM and executing it by the CPU of the address management server 103 shown in FIG. 1.

First, print job deletion instruction processing by the panel application 407 will be explained. In step SE1200, processing by the panel application 407 starts. As described above, step SE1200 is called in step SE1106 of FIG. 11. This step is also called when pressing of an erase button 1421 in FIG. 15C is received from the user. In step SE1201, the panel application 407 acquires the GUID of a print job to be deleted. In step SE1202, the panel application 407 transmits a print job deletion instruction command to the job management service 403. At this time, the panel application 407 also transmits the GUID acquired in step SE1201. In step SE1203, the process ends.

Next, print job deletion processing by the job management service 403 will be explained. In step SC1200, processing by the job management service 403 starts. In step SC1201, the job management service 403 receives the print job deletion instruction command transmitted from the panel application 407 in step SE1202. At this time, the job management service 403 also receives the GUID of the print job to be deleted. In step SC1202, the job management service 403 transmits, to the address management service 405, a print job identifier registration release command. At this time, the job management service 403 also transmits the GUID received in step SC1201.

In step SC1203, the job management service 403 searches the job management DB 404 in FIG. 4 for a record which matches the GUID received in step SC1201. In step SC1204, the job management service 403 acquires an EMFSPOOL file name from the detected record. In step SC1205, the job management service 403 deletes an EMFSPOOL file based on the acquired file name. In step SC1206, the job management service 403 deletes, from the job management DB 404 in FIG. 4, the record detected in step SC1203. In step SC1207, the process ends.

Print job identifier registration release processing by the address management service 405 will be explained. In step SD1200, processing by the address management service 405 starts. In step SD1201, the address management service 405 receives the print job identifier registration release command and the GUID serving as a target print job identifier that have been transmitted from the job management service 403 in step SC1202. In step SD1202, the address management service 405 searches the address management DB 406 in FIG. 4 for a record which matches the GUID received in step SD1201. In step SD1203, the address management service 405 deletes the record detected in step SD1202 from the job management DB 404 in FIG. 4. In step SD1204, the process ends.

[Sixth Control Processing]

In step SE902 of FIG. 9B, the print setting change window (FIG. 16A) is displayed on the display unit of the operation unit 308. Control processing when an error occurs in a print setting made by the user in printing will be described below.

The print setting made by the user is a print setting made by him using a UI provided by the virtual printer driver 401 when the virtual printer driver 401 shown in FIG. 4 receives a print instruction from the user. The user designates printing via the client PC 100, goes to the multi-function peripheral 102 which actually outputs data, and operates a panel attached to the multi-function peripheral 102. Then, the user designates print data and outputs it. At this time, if the user designates, as a print setting, a function not supported by the device (multi-function peripheral 102) which actually outputs data, the print setting becomes contradictory.

For example, when paper types supported by the output device are "plain paper" and "colored paper" and the user designates "recycled paper" as a print setting, printing cannot be done with this paper type and the print setting becomes contradictory. The generated contradiction is called an error. Control processing to solve this error will be explained below.

First, upon receiving a print instruction from the panel application 407 of the multi-function peripheral 102, the job management service 403 of the print server 101 extracts print settings from designated metadata and a print job. The job management service 403 transfers the print settings to the printer driver 408 corresponding to the output device. The printer driver 408 receives the print settings, and if a contradictory print item exists in the received print settings, creates print error data containing the item and a printable setting value list for the item. The printer driver 408 sends back the created print error data to the calling job management service 403.

Note that the printer driver may not be synchronized with the device option of the device which actually outputs data. Hence, the printer driver can communicate with the device, acquire the latest device option information, and then create print error data. When the printer driver 408 does not support this processing, the job management service 403 can create print error data using a general-purpose I/F such as Windows API.

FIG. 17 exemplifies detailed print error data. However, FIG. 17 does not limit the print error data description method. It suffices to describe a print item having an error, a setting value, and a selection list for avoiding the error.

The job management service 403 receives print error data as shown in FIG. 17 from the printer driver 408, and then transmits it to the panel application 407. The panel application 407 adds the received print error data when creating the print setting change window (FIG. 16A), and controls to display it on the operation unit 308 of the multi-function peripheral 102.

FIG. 18 exemplifies a print error data-added print setting change window displayed on the operation unit 308. A message 1801 in FIG. 18 is an error message which notifies the user that a print item having an error exists in print settings made in advance by the user. A setting 1802 in FIG. 18 displays a print item ("paper type") actually having an error, a unprintable setting value ("recycled paper"), and a setting value list ("plain paper") capable of avoiding the error. The "plain paper" column presented at the setting 1802 allows the user to select a setting value. In the print error data example shown in FIG. 17, the user can select one of three values "plain paper", "colored paper", and "undesignated". The setting value "undesignated" indicates invalidating the setting value (recycled paper) of the print setting.

A method of displaying building elements 1431 to 1437 of the print setting change window shown in FIG. 18, and control processing have been described in [Third Control Processing], and a description thereof will not be repeated. Note that the window arrangement of FIG. 18 is merely an example, and does not limit the layout, display form, and the like.

According to the present invention, when the user issues a print request from the printing apparatus for print data temporarily stored in the server, he can designate a change of print setting information. A program which runs on the printing apparatus and designates a change of print setting information requests not a client PC but a printer driver suited to the printing apparatus in the server to change print setting information. Print setting information can be changed appropriately.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-222434, filed Sep. 30, 2010, and No. 2011-136712, filed Jun. 20, 2011, which are hereby incorporated by reference herein in their entirety.

What is claimed is:

1. A printing system comprising an information processing apparatus including a virtual printer driver which generates a print job of an intermediate format, a print server which manages the print job, and a printing apparatus, said print server including:

a storage unit configured to store the print job of the intermediate format received from said information processing apparatus;

a setting change receiving unit configured to receive, from said printing apparatus, a print setting information change instruction for the print job of the intermediate format stored in said storage unit;

an update unit configured to update print setting information of the print job in accordance with the print setting information change instruction;

a print request receiving unit configured to receive a print request from said printing apparatus; and a job transmission unit configured to generate a print job of a format printable by said printing apparatus based on the print job of the intermediate format and the print setting information updated by said update unit in accordance with the print request, and to transmit the generated print job to said printing apparatus, said printing apparatus including:

a selection unit configured to select a print job;

a setting changing unit configured to change the print setting information for the print job selected by said selection unit;

an inquiry unit configured to inquire, to the print server, whether the print setting information changed by said setting changing unit is applicable to the print job selected by said selection unit;

a display control unit configured to display a warning window, in a case where a response to an inquiry by said inquiry unit indicates that the print setting information changed by said setting changing unit is not applicable to the print job selected by said selection unit;

a print request transmission unit configured to transmit the print request to said print server for the print job, in a case where a response to an inquiry by said inquiry unit indicates that the print setting information changed by said setting changing unit is applicable to the print job selected by said selection unit; and a printing unit configured to print the print job transmitted by said job transmission unit.

2. The system according to claim 1, wherein said update unit of said print server changes a setting using a user token received from said information processing apparatus.

3. The system according to claim 1, wherein the print setting information change instruction includes a change of at least one of a copy count, imposition, color mode, and pages per sheet.

4. The system according to claim 1, wherein when the print job is to be converted into a format outputtable by a predetermined printing apparatus in accordance with the print request and a printer driver which corresponds to the predetermined printing apparatus and can convert the print job into the outputtable format is not installed, said job transmission unit of said print server newly installs the printer driver corresponding to the predetermined printing apparatus.

5. A printing method in a printing system including an information processing apparatus including a virtual printer driver which generates a print job of an intermediate format, a print server which manages the print job, and a printing apparatus, comprising in the print server:

a storage step of storing, in a storage unit, the print job of the intermediate format received from the information processing apparatus;

a setting change receiving step of receiving, from the printing apparatus, a print setting information change instruction for the print job of the intermediate format stored in the storage unit;

an update step of updating print setting information of the print job in accordance with the print setting information change instruction;

a print request receiving step of receiving a print request from the printing apparatus; and a job transmission step of generating a print job of a format printable by the printing apparatus based on the print job of the intermediate format and the print setting information updated in the update step in accordance with the print request, and transmitting the generated print job to the printing apparatus, and comprising in the printing apparatus:

a selection step of selecting a print job;

a setting changing step of changing the print setting information for the print job selected in the selection step;

an inquiry step of inquiring, to the print server, whether the print setting information changed in the setting changing step is applicable to the print job selected in the selection step;

a display control step of displaying a warning window, in a case where a response to an inquiry in the inquiry step indicates that the print setting information changed in the setting changing step is not applicable to the print job selected in the selection step;

a print request transmission step of transmitting the print request to the print server for the print job, in a case where a response to an inquiry in the inquiry step indicates that the print setting information changed in the setting changing step is applicable to the print job selected in the selection step; and a printing step of printing the print job transmitted in the job transmission step.

6. A printing apparatus which is communicable with a print server which manages a print job, the printing apparatus comprising:

a display unit configured to display a selection window for a print job managed by the print server;

a selection unit configured to select a print job in accordance with an instruction input via the selection window;

a setting changing unit configured to change print setting information for the print job selected by the selection unit;

an inquiry unit configured to inquire, to the print server, whether the print setting information changed by the setting changing unit is applicable to the print job selected by the selection unit;

a display control unit configured to display a warning window, in a case where a response to an inquiry by the inquiry unit indicates that the print setting information changed by the setting changing unit is not applicable to the print job selected by the selection unit;

a print request transmission unit configured to transmit a print request to the print server for the print job, in a case where a response to an inquiry by the inquiry unit indicates that the print setting information changed by the setting changing unit is applicable to the print job selected by the selection unit; and a printing unit configured to print the print job transmitted in accordance with the print request.

7. The apparatus according to claim 6, wherein the setting changing unit changes two-sided printing to one-sided printing or the one-sided printing to the two-sided printing.

8. The apparatus according to claim 6, wherein the warning window is displayed in a case where a paper size of the selected print job is a post card and one-sided printing is changed to two-sided printing.

9. The apparatus according to claim 6, wherein the print setting information of the print job managed by the print server is displayed on the selection window.

10. A method of controlling a printing apparatus which is communicable with a print server which manages a print job, comprising:
displaying a selection window for a print job managed by the print server;
selecting a print job in accordance with an instruction input via the selection window;
changing print setting information for the selected print job;
inquiring, to the print server, whether the changed print setting information is applicable to the selected print job;
in a case where a response to the inquiring indicates that the changed print setting information is not applicable to the selected print job, displaying a warning window;
in a case where a response to the inquiring indicates that the changed printing setting information is applicable to the selected print job, transmitting a print request to the print server for the print job; and
printing the print job transmitted in accordance with the print request.

11. The method according to claim 10, wherein, for the print setting information for the selected print job, two-sided printing is changed to one-sided printing, or the one-sided printing is changed to the two-sided printing.

12. The method according to claim 10, wherein the warning window is displayed in a case where a paper size of the selected print job is a post card and one-sided printing is changed to two-sided printing.

13. The method according to claim 10, wherein the print setting information of the print job managed by the print server is displayed on the selection window.

14. A non-transitory computer-readable medium storing a program comprising computer-executable instructions, which when executed implement a method of controlling a printing apparatus which is communicable with a print server which manages a print job, the method comprising:
displaying a selection window for a print job managed by the print server;
selecting a print job in accordance with an instruction input via the selection window;
changing print setting information for the selected print job;
inquiring, to the print server, whether the changed print setting information is applicable to the selected print job;
in a case where a response to the inquiring indicates that the changed print setting information is not applicable to the selected print job, displaying a warning window;
in a case where a response to the inquiring indicates that the changed print setting information is applicable to the selected print job, transmitting a print request to the print server for the print job; and
printing the print job transmitted in accordance with the print request.

15. The medium according to claim 14, for the print setting information for the selected print job, two-sided printing is changed to one-sided printing, or the one-sided printing is changed to the two-sided printing.

16. The medium according to claim 14, wherein the warning window is displayed in a case where a paper size of the selected print job is a post card and one-sided printing is changed to two-sided printing.

17. The medium according to claim 14, wherein the print setting information of the print job managed by the print server is displayed on the selection window.

* * * * *